(12) United States Patent
Monroe

(10) Patent No.: US 11,940,891 B2
(45) Date of Patent: Mar. 26, 2024

(54) LOW LATENCY FAULT AND STATUS INDICATOR IN SERIAL COMMUNICATION

(71) Applicant: Texas Instruments Incorporated, Dallas, TX (US)

(72) Inventor: Scott Allen Monroe, Frisco, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 40 days.

(21) Appl. No.: 17/388,858

(22) Filed: Jul. 29, 2021

(65) Prior Publication Data

US 2023/0031600 A1 Feb. 2, 2023

(51) Int. Cl.
  *G06F 11/00* (2006.01)
  *G06F 11/07* (2006.01)
  *G06F 11/30* (2006.01)
  *G06F 13/42* (2006.01)

(52) U.S. Cl.
  CPC ...... *G06F 11/3027* (2013.01); *G06F 11/0772* (2013.01); *G06F 11/0784* (2013.01); *G06F 13/4282* (2013.01)

(58) Field of Classification Search
  CPC ............. G06F 13/4282; G06F 11/3027; G06F 11/0772; G06F 11/0784
  See application file for complete search history.

(56) References Cited

U.S. PATENT DOCUMENTS

| | | | |
|---|---|---|---|
| 5,367,644 A | 11/1994 | Yokoyama et al. | |
| 9,755,821 B2 | 9/2017 | Jang et al. | |
| 2012/0243426 A1* | 9/2012 | Matsui | H04L 1/1887 370/252 |
| 2015/0347218 A1* | 12/2015 | Domingues | H04L 1/0082 714/48 |
| 2018/0330127 A1* | 11/2018 | Colombo | H04W 12/106 |
| 2020/0159615 A1 | 5/2020 | Wu et al. | |

OTHER PUBLICATIONS

International Search Report for PCT/US2022/038667 dated Nov. 7, 2022; 4 pages.
Written Opinion for PCT/US2022/038667 dated Nov. 7, 2022; 4 pages.

\* cited by examiner

*Primary Examiner* — Philip Guyton
(74) *Attorney, Agent, or Firm* — Ray A. King; Frank D. Cimino

(57) ABSTRACT

A method, system, and apparatus for fault detection in a microprocessor-based system uses a serial data communication protocol for communications between a peripheral device and a controller. Peripheral device interface circuitry is adapted to intermittently receive input serial data frames from the controller using the serial communication protocol and to intermittently send output serial data frames to the controller using the serial communication protocol. Each output serial data frame includes one or more status bits representing communication status data and one or more data bits representing peripheral device data. The status bits and the data bits are serially followed by at least one fault bit that indicates whether a fault is detected during sending of the output serial data frame.

18 Claims, 16 Drawing Sheets

LOW LATENCY FAULT AND STATUS INDICATOR IN SERIAL COMMUNICATION

BACKGROUND

This description relates to serial communication techniques, and more particularly to providing a low latency indicator of faults in serial communications.

Functional safety systems can be used in automotive, industrial, aerospace and other applications to provide automated protection against communication errors, equipment failures, or other faults in systems of the underlying application. Functional safety depends on proper operation of a system in response to inputs and predictable responses to human errors, software or hardware failures, environmental factors, and operational fatigue. Internal fault monitoring and protection can support the overall goal of functional safety by identifying faults and taking prompt action to correct or otherwise address the fault.

In electronic systems, integrated circuits associated with sensors, drivers, or other components may transmit status information indicating the current status of the components, including identifying when a fault condition is present, to a main microcontroller for the system. This status information can be used to alert the microcontroller to the existence of a fault condition, in response to which the microcontroller can perform predetermined operations to identify, diagnose, and address the fault. Serial communication can be used to economically and reliably communicate status information in an overall automotive, industrial, or other system. In an automotive system, for example, power management integrated circuits (PMICs), motor driver circuits, and sensor interface circuits may communicate with a microcontroller and can communicate commands, data, status, and other data during operation.

SUMMARY

In accordance with aspects described in this specification, an apparatus includes a serial output communication pin and an interface circuit communicably connected to the serial output communication pin. The interface circuit is adapted to intermittently send an output serial data frame to a controller via the serial output communication pin. Each output serial data frame includes a status phase and a data phase followed by one or more fault bits. The one or more fault bits indicate whether a fault is detected during sending of the output serial data frame.

Implementations of the apparatus can include one or more of the following features. The apparatus includes a serial input communication pin communicably connected to the interface circuit, and the interface circuit is adapted to intermittently receive an input serial data frame from the controller via the serial input communication pin. Each input serial data frame includes a command, and the status phase includes status data for a command included in a preceding input serial data frame. A peripheral device is connected to the interface circuit, and the command included in the input serial data frame from the controller includes an instruction for the peripheral device. The one or more fault bits include a serial communication fault flag bit indicating whether a fault in the serial communication is detected and a peripheral device diagnostic detection fault bit indicating whether a fault is detected in the peripheral device. The controller is adapted to send commands to a plurality of interface circuits, and each interface circuit is connected to at least one corresponding peripheral device. The serial input communication pin is adapted to receive commands and operational data. The peripheral device is a power management integrated circuit, a motor driver, or a sensor. The apparatus includes an enable pin and a clock pin. The one or more fault bits include a fault flag bit indicating whether a fault is detected and a redundancy bit providing a redundant indication of whether a fault is detected. The output serial data frame includes a plurality of status bits, a plurality of data bits, and a plurality of cyclic redundancy bits, followed by the one or more fault bits. The apparatus includes a first peripheral device, and the interface circuit includes peripheral device interface circuitry adapted to communicate with a microcontroller using a serial communication protocol. The peripheral device interface circuitry is adapted to intermittently receive input serial data frames from the microcontroller using the serial communication protocol and to intermittently send output serial data frames to the microcontroller using the serial communication protocol. Each output serial data frame includes one or more status bits representing communication status data in the status phase and one or more data bits representing peripheral device data in the data phase. The interface circuit is adapted to communicate with the controller via a serial communication interface (e.g., a serial peripheral interface bus, an $I^2C$ communication bus, an $I^2S$ communication bus, or a universal asynchronous receiver/transmitter).

In accordance with additional aspects described in this specification, an integrated circuit includes a plurality of pins, including one or more serial data communication pins, peripheral device interface circuitry configured to communicate with a microcontroller using a serial communication protocol, and one or more registers accessible by the peripheral device interface circuitry. The peripheral device interface circuitry is further configured to intermittently receive input serial data frames from the microcontroller via at least one of the one or more serial data communication pins using the serial communication protocol and to intermittently send output serial data frames to the microcontroller via at least one of the one or more serial data communication pins using the serial communication protocol. The one or more registers accessible by the peripheral device interface circuitry include a serial data output register adapted to store data for inclusion in the output serial data frames. The data includes one or more status bits representing communication status data, one or more data bits representing peripheral device data, and at least one fault bit. The peripheral device interface circuitry is configured to generate each output serial data frame using data stored in the serial data output register so that the output serial data frame includes the one or more status bits and the one or more data bits serially followed by at least one fault bit. The at least one fault bit indicates whether a fault is detected during sending of the output serial data frame.

Implementations of the apparatus can include one or more of the following features. The peripheral device interface circuitry is configured to store data from the input serial data frames in at least one of the one or more registers, and the input serial data frames include instructions for a peripheral device communicably coupled to the peripheral device interface circuitry. The integrated circuit includes logic configured to set, during sending of a particular output serial data frame, a value of the at least one fault bit in the serial data output register in response to detecting a fault in receiving the input serial data frame, and to include, in the particular output serial data frame, the value of the at least one fault bit in the serial data output register. The peripheral device interface circuitry is configured to set, during sending of a particular output serial data frame, a value of the at least one fault bit in the serial data output register in response to detecting a diagnostic fault in a peripheral device communicably coupled to the peripheral device interface circuitry and to include, in the particular output serial data frame, the value of the at least one fault bit in the serial data output register. The integrated circuit includes logic configured to set the one or more status bits for a particular output serial data frame to indicate whether a fault is detected; set, during sending of a particular output serial data frame and after setting the one or more status bits, a value of the at least one fault bit in the serial data output register in response to detecting a fault; and include, in the particular output serial data frame, the value of the at least one fault bit in the serial data output register.

In accordance with additional aspects described in this specification, a method includes initiating sending of an output serial data frame that includes a status phase and a data phase to a microcontroller via a serial communication bus connected to the microcontroller, detecting a fault during sending of the output serial data frame, setting a fault flag in the output serial data frame in response to detecting the fault, and transmitting the fault flag in the output serial data frame.

Implementations of the apparatus can include one or more of the following features. Setting a fault flag in the output serial data frame in response to detecting the fault includes setting at least one fault flag bit in a register after transmitting at least one bit of the output serial data frame and inserting the at least one fault flag bit in the output serial data frame. The output serial data frame is sent by an interface circuit of a peripheral device, and the method further includes receiving the fault flag at the microcontroller and enabling a subsequent communication between the peripheral device and the microcontroller in response to receiving the fault flag at the microcontroller.

In accordance with additional aspects described in this specification, an apparatus includes a peripheral device and peripheral device interface circuitry adapted to communicate with a microcontroller using a serial communication protocol. The peripheral device interface circuitry is adapted to intermittently receive input serial data frames from the microcontroller using the serial communication protocol and to intermittently send output serial data frames to the microcontroller using the serial communication protocol. Each output serial data frame includes one or more status bits representing communication status data and one or more data bits representing peripheral device data. The status bits and the data bits are serially followed by one or more fault bits indicating whether a fault is detected during sending of the output serial data frame.

Implementations of the apparatus can include one or more of the following features. The input serial data frames include instructions for the peripheral device. The peripheral device interface circuitry is adapted to set a value of the one or more fault bits in response to detecting a fault in receiving the input serial data frame. The peripheral device interface circuitry is adapted to set a value of the one or more fault bits in response to detecting a diagnostic fault in the peripheral device. The apparatus includes multiple peripheral devices, each peripheral device has corresponding peripheral device circuitry, and a serial communication bus connects the corresponding peripheral device interface circuitry for each of the peripheral devices to the microcontroller.

In accordance with additional aspects described in this specification, a system includes a microcontroller, a serial communication bus connected to the microcontroller, and multiple peripheral devices connected to the serial communication bus. Each of the peripheral devices includes a corresponding interface circuit communicably connected to the serial communication bus and is adapted to intermittently send an output serial data frame to a controller via the serial output communication bus. The output serial data frame for a first peripheral device of the multiple peripheral devices includes a status phase and a data phase followed by one or more fault bits, and the one or more fault bits indicate whether a fault is detected during sending of the output serial data frame.

Implementations of the system can include one or more of the following features. The interface circuit for each of the peripheral devices is further adapted to intermittently receive an input serial data frame from a controller via the serial communication bus. The input serial data frame includes commands for at least one of the interface circuit or the peripheral device. The output serial data frame for each peripheral device includes a status phase and a data phase followed by one or more fault bits indicating whether a fault is detected during sending of the output serial data frame. The one or more fault bits indicate whether a fault for at least one of the interface circuit or the corresponding peripheral device is detected during sending of the output serial data frame. The one or more fault bits includes a primary fault bit and a redundancy bit. At least one peripheral device includes an actuator for a safety component, at least one peripheral device includes a sensor, and the microcontroller is adapted to send input serial data frames to an interface circuit corresponding to the actuator in response to data included in at least one output serial frame sent by the interface circuit corresponding to the sensor.

DESCRIPTION OF DRAWINGS

Like reference symbols in the various drawings indicate like elements.

DETAILED DESCRIPTION

In accordance with aspects described in this specification, status flags are provided to a control system (e.g., a microprocessor unit) by integrated circuits (e.g., power management integrated circuits (PMICs), motor driver integrated circuits, sensor interface integrated circuits) via serial communication. An intermittent (e.g., periodic or repeating but non-periodic) serial communication frame is used to send data between the integrated circuits and the control system. The serial communication frame can include status data, device data, and cyclic redundancy check (CRC) data. The status data can provide communication status, for example, regarding whether a previous serial communication frame was properly received. Other status data may also be included. The device data can include, for example, any data that the integrated circuit or a connected device (e.g., a power management subsystem, a motor driver or motor, or a sensor) is programmed or otherwise constructed to send to the control system. The CRC data can include any data that facilitates confirming that the serial data frame is correctly received.

In addition, status flags can also be included in the serial communication frame to provide information indicating whether a fault occurs during the serial communication frame to the control system, including if something goes wrong with the current serial communication. Thus, the control system can be informed of a new fault before the next serial communication frame. This capability avoids latency of the overall system's ability to detect and react to a fault detection and, in some cases, may avoid a need for higher frequency polling of fault flags through serial communication, which can put an additional burden on software and serial communication in the system.

Figure 1:
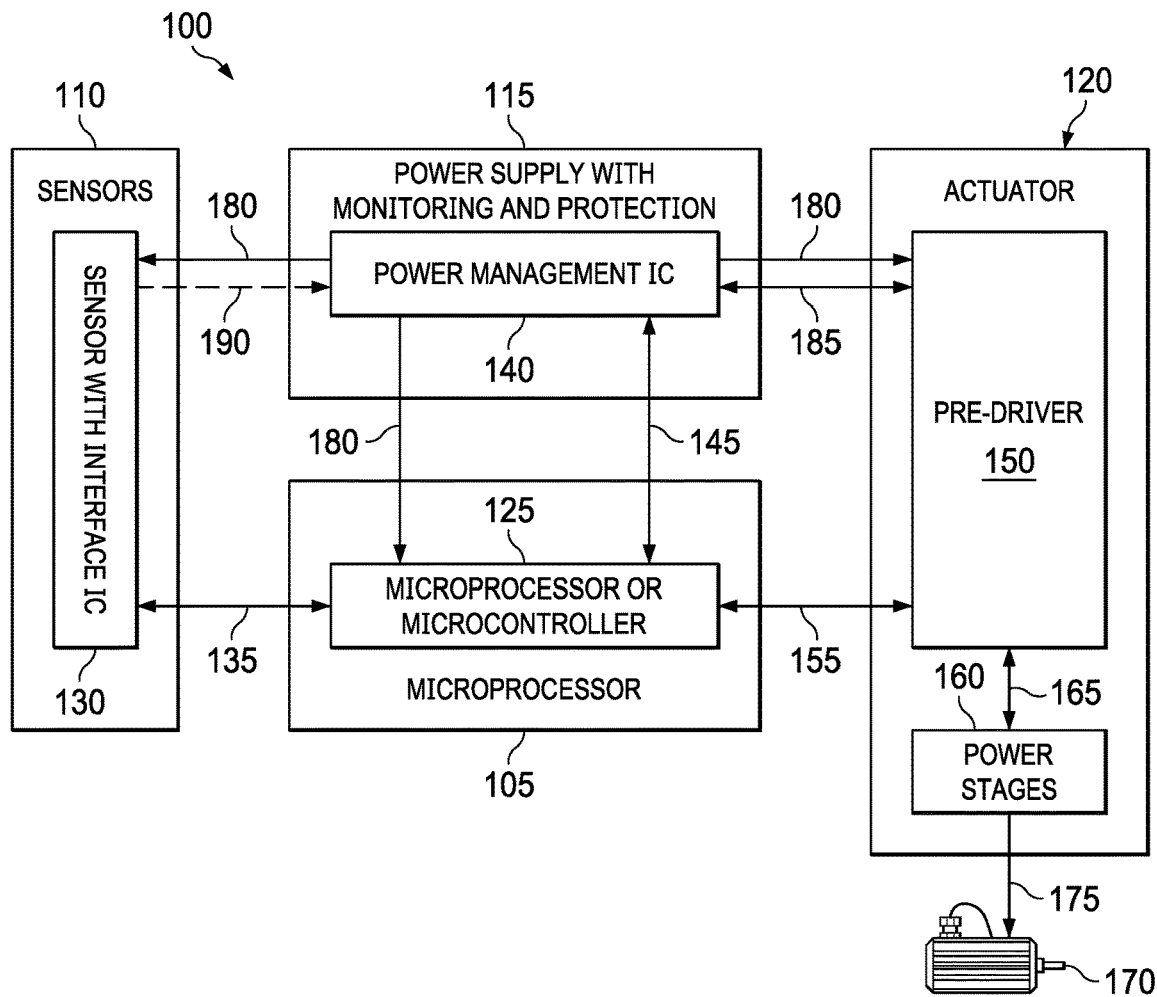
FIG. 1 is an illustrative example of a multi-component system.

FIG. 1 depicts an illustrative example of a multi-component system 100. The system 100 includes a microprocessor 105. The microprocessor 105 can operate as a controller for a plurality of components. For example, the components in the illustrated example include sensors 110, a power supply (e.g., with integrated monitoring and protection) 115, and an actuator 120 (e.g., for a motor driver). The microprocessor 105 can include a microprocessor unit or microcontroller 125 that operates as a master controller for the components in the multi-component system 100. The components can operate as peripheral devices under control of the microprocessor 105. Although only one block each is illustrated for sensors 110, power supply 115, and actuator 120 for convenience, a multi-component system 100 can include multiple different sensors 110, power supplies 115, and actuators 120 that can perform redundant or different functions. In some implementations, the components can communicate with other controllers or systems as part of their operation.

Each of the sensors 110 can include a sensor 130 with an interface integrated circuit (IC) that can send sensor data to the microprocessor 105 and receive commands from the microprocessor 105 via a two-way communication bus 135 (e.g., a serial communication bus). The power supply 115 can include a power management integrated circuit 140 that can send power management reporting data to the microprocessor 105 and receive commands from the microprocessor 105 via a two-way communication bus 145. The actuator 120 can include a pre-driver 150 that includes a pre-driver integrated circuit and can send actuator or motor data to the microprocessor 105 and receive commands from the microprocessor 105 via a two-way communication bus 155. The pre-driver 150 can control, and receive monitoring data from, power stages 160 (as indicated at 165), which in turn drive motors 170 (as indicated at 175). The power management integrated circuit 140 can control a power supply to the various other components (as indicated at 180).

In some implementations, the pre-driver 150 can communicate with the power management integrated circuit 140 (as indicated at 185), directly (i.e., through a dedicated or shared bus between the pre-driver and the power management integrated circuit 140) or via the microprocessor 125. The sensors 130 can also provide data to the power management integrated circuit 140 (as indicated at 190), directly or via the microprocessor 125.

The microprocessor 105 can control serial communications on shared bus lines by selectively enabling communications with the integrated circuits of each of the components 110, 115, and 120 (e.g., to allow only one component to communicate on a particular bus line during any given time period). In various implementations, the integrated circuits of each of the components 110, 115, and 120 can be embedded in the respective component 110, 115, or 120 or can be a separate component that is electrically and/or communicably connected to the respective component 110, 115, or 120. In some implementations, the system 100 can include multiple microprocessors 105 that, for example, control different parts of an overall system. The system 100 can also be a subsystem of a larger system and/or can have multiple subsystems, which may also be described as a system. The system 100 can implement functional safety features through, for example, communications between the various components and the microprocessor 105.

Figure 2:
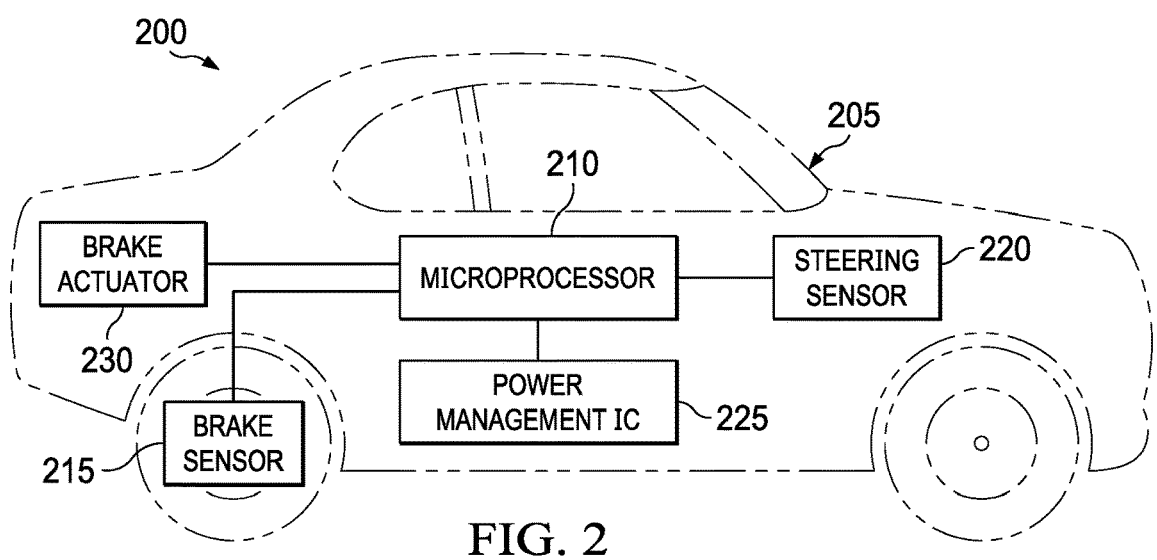
FIG. 2 is a vehicle system that includes an example implementation of the multi-component of FIG. 1.

FIG. 2 is a vehicle system 200 that includes an example implementation of the multi-component of FIG. 1. The vehicle system 200 includes an automobile 205 with a microprocessor 210 that monitors and controls various subsystems in the automobile 205, including a brake sensor 215, a steering sensor 220, a power management integrated circuit 225, and a brake actuator 230. The microprocessor 210 controls power to the various components 215, 220, 225, and 230 in response to data signals from the power management integrated circuit 225. Alternatively, the power management integrated circuit 225 controls power to the various components 215, 220, 225, and 230 independently or in response to data signals from the microprocessor 210. The microprocessor 210 also receives signals from the brake sensor 215 and the steering sensor 220 and can issue commands in response to the sensor signals. For example, the microprocessor 210 can issue commands to the brake actuator 230 to perform an anti-lock brake function in response to data received from the brake sensor 215, and the microprocessor 210 can issue commands to the power management integrated circuit 225 to provide or cut off power to another component in response to data received from the steering sensor 220. The illustrated components 215, 220, 225, and 230 are just an illustrative example. Any number of other components and other functions can also be controlled by the microprocessor 210 in response to data signals (e.g., traction control, anti-lock braking, power steering control, driver warning indicators, automated cruise control adjustments, self-driving functions, engine control, etc.).

Functional safety operations in the vehicle system 200 rely on near real-time status updates from the various components 215, 220, 225, and 230 to detect and address faults in the operation of the overall vehicle system 200. Near real-time functionality can be determined based on a desirable or necessary degree of responsiveness for a particular safety operation. For some operations, near-real time functionality can be on the order of microseconds or milliseconds. Faults can include communication errors (e.g., incorrectly received data frames, missing data acknowledgements, CRC errors, or clock errors), diagnostic faults (e.g., sensors detecting a problem condition, missing sensor data, overvoltage or undervoltage conditions, other device or power failures, or out-of-range thermal conditions), or any other types of faults that can impact the safe and proper operation of the overall vehicle system 200. Microprocessor-based functional safety operations can also be used in other contexts, including, without limitation, industrial safety, aerospace, public transportation, etc. Status updates can be sent, for example, using serial communication (e.g., serial peripheral interface (SPI) bus, an $I^2C$ communication bus, an $I^2S$ communication bus, a universal asynchronous receiver/transmitter, or another serial communication technique).

Figure 3A:
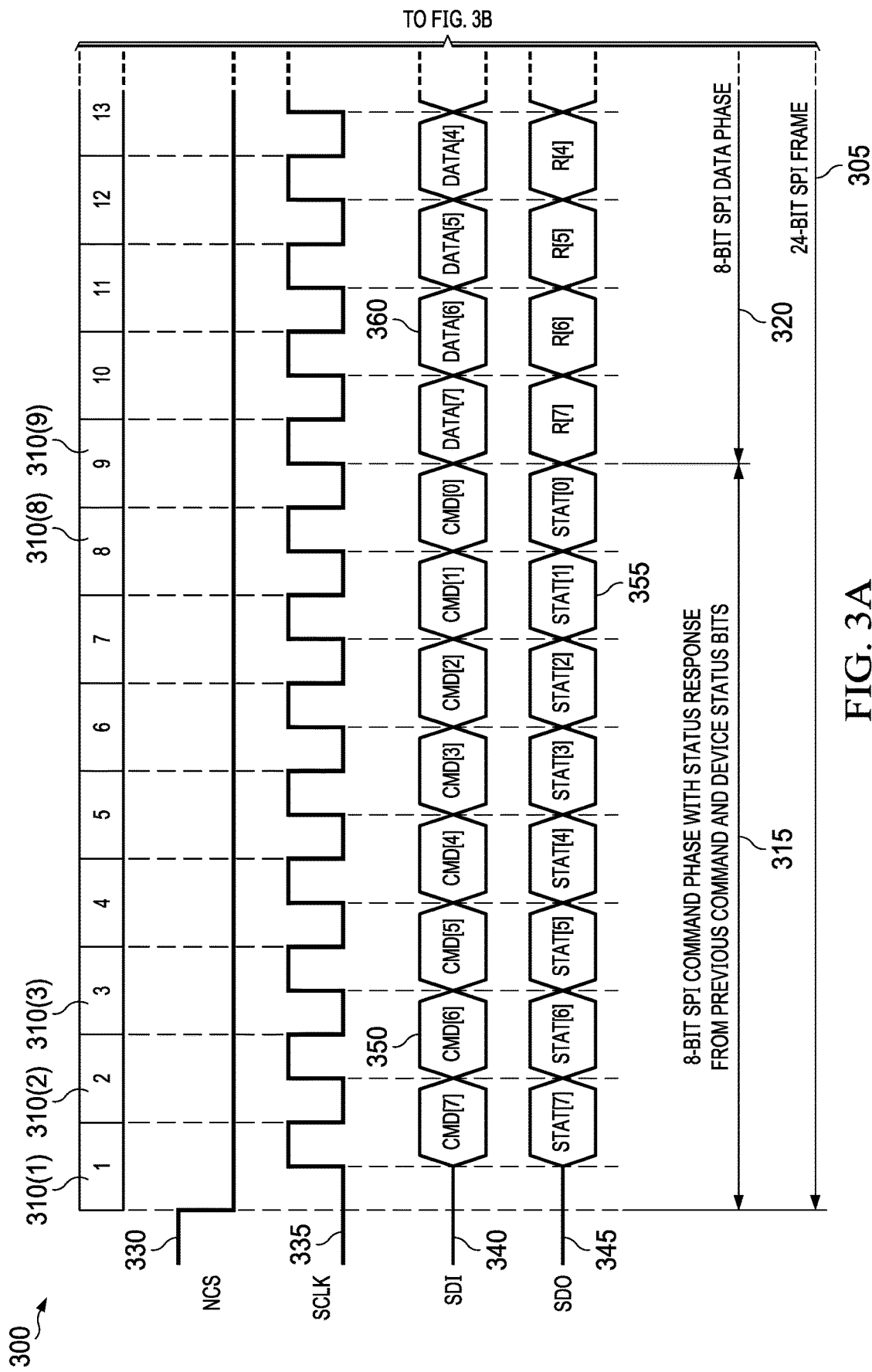
FIG. 3A-3B is a waveform timing diagram for a frame of a serial peripheral interface (SPI) bus that is used to communicate between a master controller and a peripheral device interface.
Figure 3B:
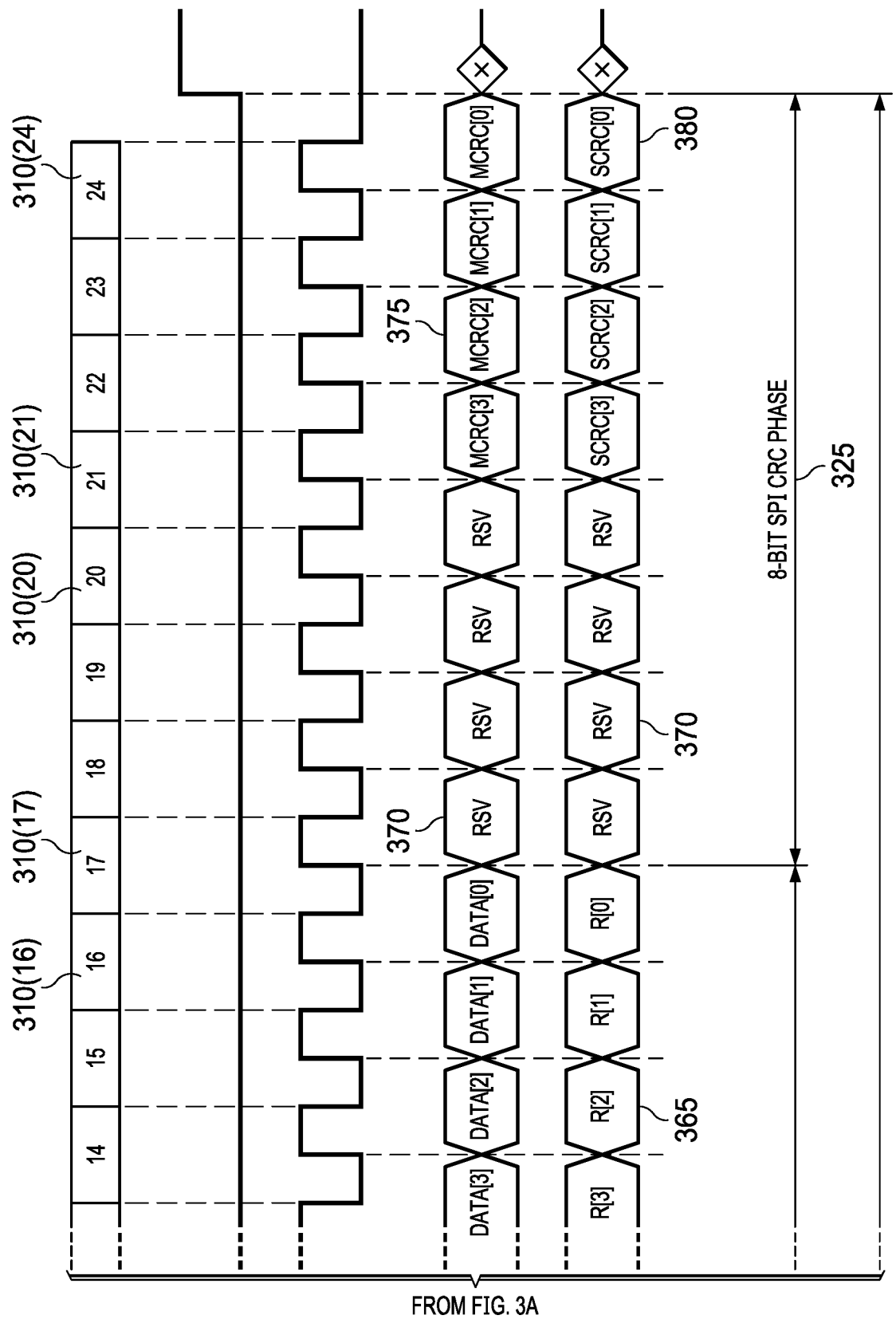
Figure 4A:
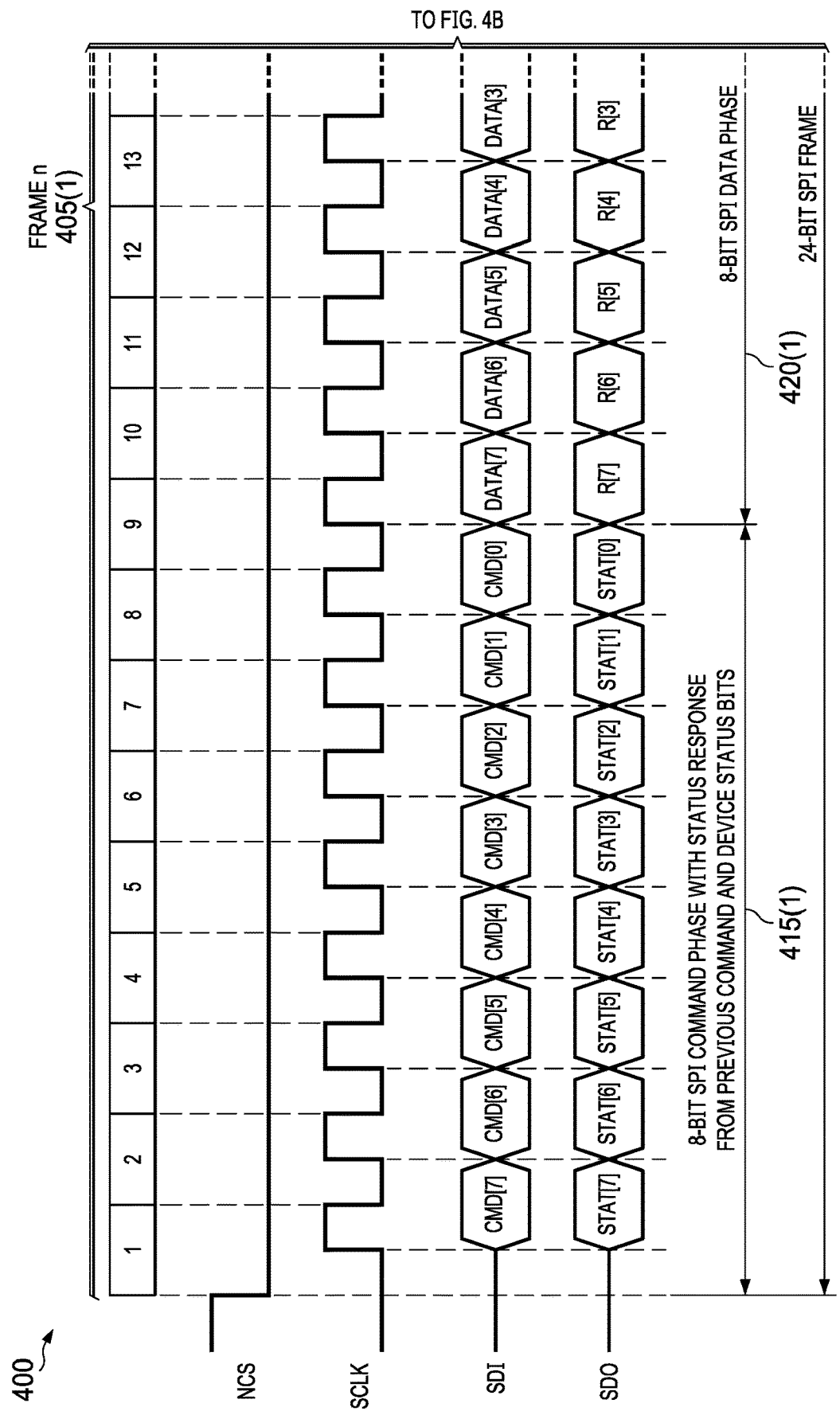
FIG. 4A-4D is a waveform timing diagram for a sequential pair of frames of the serial peripheral interface (SPI) bus discussed in connection with FIG. 3A-3B.
Figure 4B:
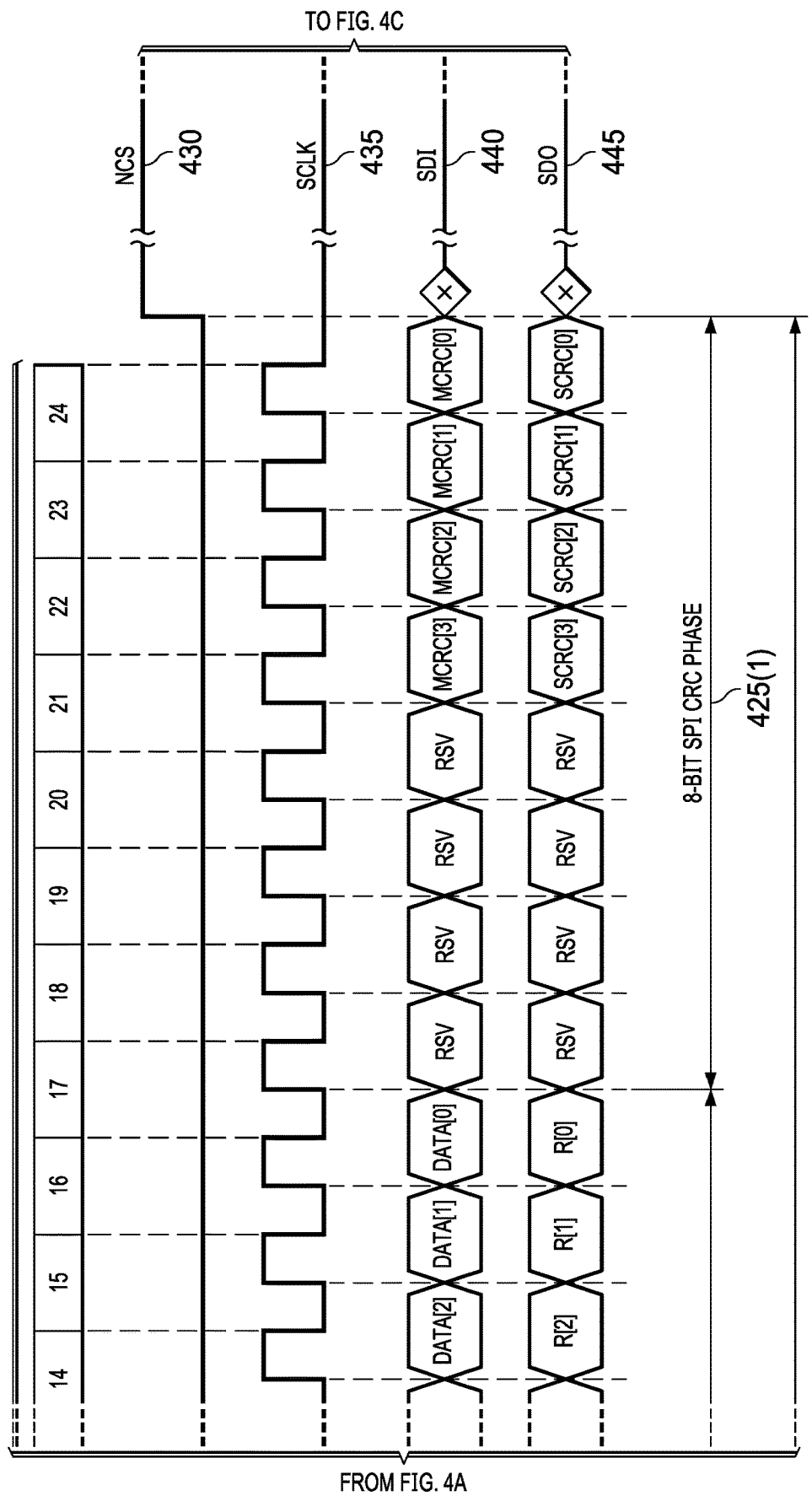
Figure 4C:
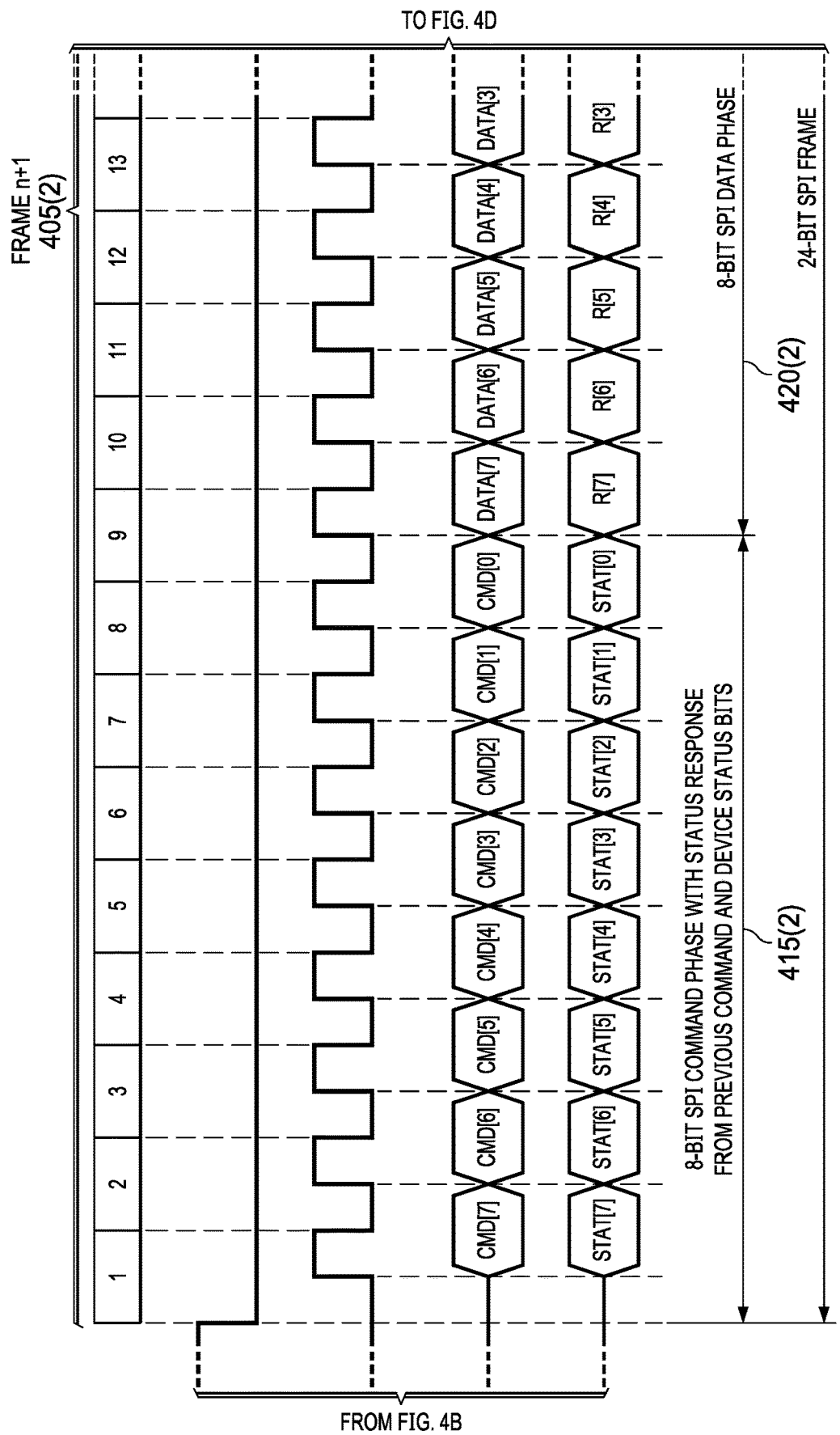
Figure 4D:
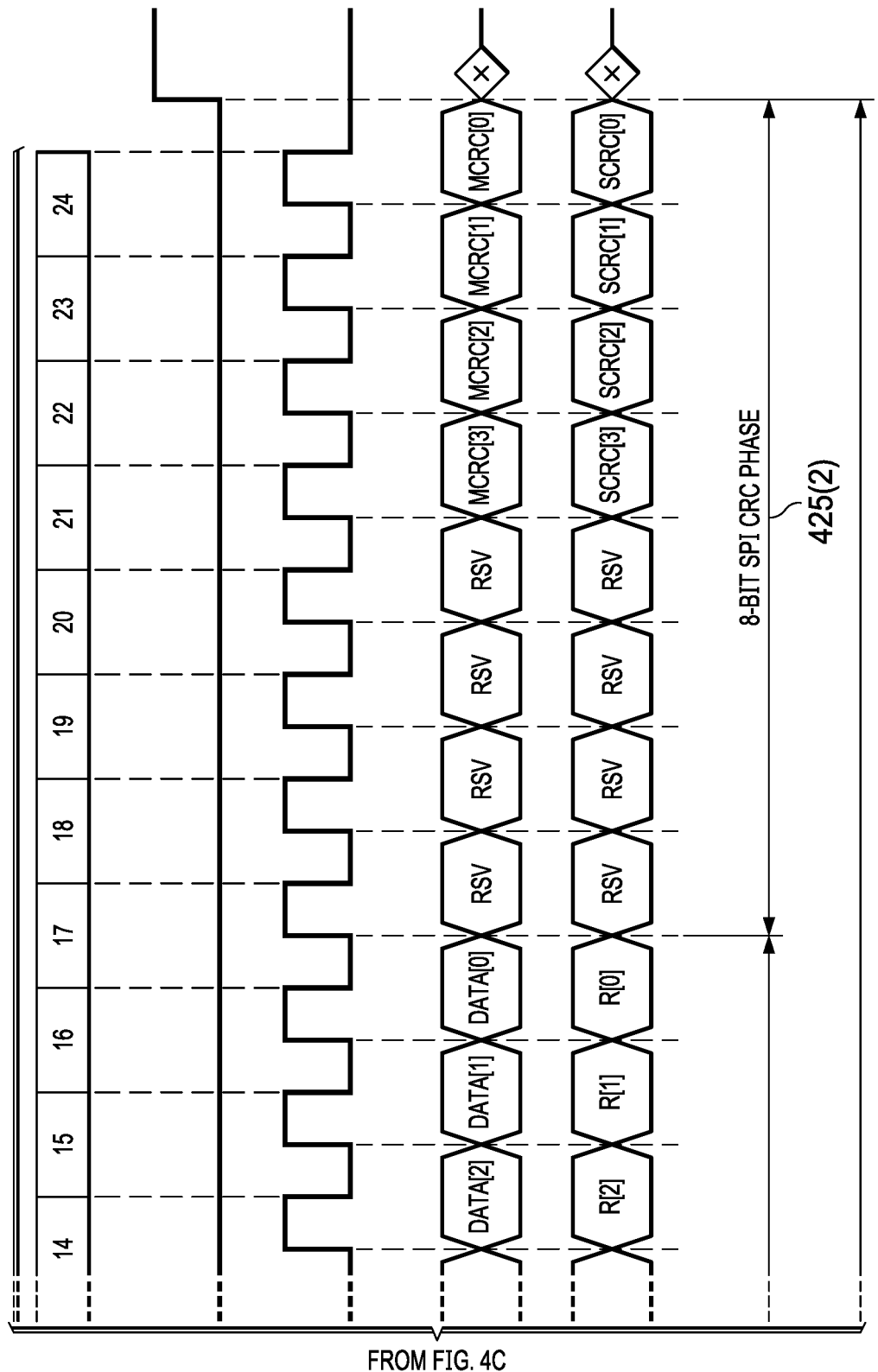

FIG. 3A-3B shows a waveform timing diagram 300 for a frame 305 of a serial peripheral interface (SPI) bus that is used to communicate between a master controller and a peripheral device interface. The master controller can be a microprocessor (e.g., the microprocessor 105 of FIG. 1 or the microprocessor 210 of FIG. 2), and the peripheral device can be a component (e.g., any of the components 110, 115, 120, 215, 220, 225, or 230 of FIGS. 1 and 2) that is at least partially controlled by, or reports to, the master controller. In various implementations, the peripheral device can be an integrated circuit embedded in a component (e.g., a sensor, power supply, or driver) or an interface integrated circuit that handles communications for a separate component (e.g., an interface circuit for a sensor, power supply, or driver). In some situations, the component can be referred to as the peripheral device and can have a corresponding peripheral device interface circuit. In addition, although the frame 305 is referred to in the singular, the frame 305 represents a bi-directional communication, and the communication in each direction can separately be referred to as a frame, including in implementations where the input and output data are not sent simultaneously.

The frame 305 includes a plurality of timeslots 310, which may be arranged in phases (e.g., subframes). In the illustrated example, the frame 305 includes 24 timeslots, including a command phase 315, a data phase 320, and a cyclic redundancy code (CRC) phase 325. The frame 305 represents a two-way communication between the master controller and the peripheral device, where input data in one direction is transmitted at the same time (i.e., during the same frame interval) as output data transmitted in the other direction. Communication with the peripheral device can be enabled using a low value of a chip select signal 330 (e.g., on a Chip Select Not (NCS) pin). In alternative implementations, a high value can be used on a chip select pin to enable communications via the peripheral device interface. The NCS pin allows a serial communication clock signal (SCLK) 335, a serial data input (SDI) signal 340, and a serial data output (SDO) signal 345 to be sent on serial communication bus lines that are shared between multiple peripheral device interfaces and the master controller. Input and output in this context are from the perspective of the peripheral device. The peripheral device interfaces are serially enabled by the master controller using a low signal on their respective chip select pins. In the illustrated example, one bit is transmitted in each timeslot 310, and each timeslot is signaled by a high value of the clock signal 335.

The command phase 315 includes eight timeslots beginning with a first timeslot 310(1) (and followed by a second timeslot 310(2), a third timeslot 310(3), and so on) and ending with an eighth timeslot 310(8). During each timeslot 310 of the command phase 315, a command bit (CMD[n]) 350 is transmitted by the master controller to the peripheral device interface and a status bit (STAT[n]) 355 is transmitted by the peripheral device interface to the master controller. The command bits 350 individually or collectively can communicate one or more commands to the peripheral device. The status bits 355 can communicate a status response to a previous command (e.g., data regarding whether the command was properly received, any errors in the communication, and/or a status of execution of the command) and other peripheral device status information.

The data phase 320 includes eight timeslots beginning with a ninth timeslot 310(9) of the frame 305 and ending with a $16^{th}$ timeslot 310(16). During each timeslot 310 of the data phase 320, a master data bit (DATA[n]) 360 is transmitted by the master controller to the peripheral device interface and a peripheral data bit (R[n]) 365 is transmitted by the peripheral device interface to the master controller. The master data bits 360 can communicate, for example, data associated with the commands (e.g., values used in executing the commands) to the peripheral device interface. The peripheral data bits 365 can communicate data that the peripheral device interface is sending out to the master controller (e.g., for use by the master controller in performing operations or for communication to other peripheral devices).

The CRC phase 325 includes eight timeslots beginning with a $17^{th}$ timeslot 310(1) of the frame 305 and ending with a $24^{th}$ timeslot 310(8). Some timeslots 310(19)-310(20) are reserved in the illustrated example, including reserved (RSV) bits 370 of the serial data input signal 340 and the serial data output signal 345. During each of the remaining timeslots 310(21)-310(24) of the CRC phase 325, a master CRC bit (MCRC[n]) 375 is transmitted by the master controller to the peripheral device interface and a peripheral CRC (SCRC[n]) bit 380 is transmitted by the peripheral device interface to the master controller. The master CRC bits 375 and the peripheral CRC bits 380 provide cyclic redundancy check data to enable the receiving device to check that the data in the frame is properly received and in some cases to correct errors in the received data.

In some implementations, the command bits 350, status bits 355, master data bits 360, and peripheral data bits 365 (or some subset thereof) can indicate that the applicable data is stored in a register or a particular location of a register instead of communicating the data directly. For example, the status bits 355 can indicate to the master controller an address in a register where the applicable status data has been placed by the peripheral device or the peripheral device interface. Similarly, the command bits 350 can indicate to the peripheral device interface an address in a register where the applicable command data has been placed by the master controller. Thus, the command bits 350, for example, can constitute a command even if the some or all of the instructions of the command are stored in a separate register at a predetermined location or at an address identified by the command bits 350.

FIG. 4A-4D shows a waveform timing diagram 400 for a sequential pair of frames 405(1) and 405(2) of the serial peripheral interface (SPI) bus discussed in connection with FIG. 3A-3B. The first frame 405(1) is not necessarily first in a sequence of frames but can be a frame n in a sequence of frames sent between the master controller and a particular peripheral device interface, while the second frame 405(2) is the next serial frame n+1 in the sequence of frames sent between the master controller and the particular peripheral device interface. The first frame 405(1) includes a command phase 415(1), a data phase 420(1), and a CRC phase 425(1). The command phase 415(1) of the first frame 405(1) can include one or more status responses (e.g., encoded in a serial data output signal 445) to one or more commands received in a previous frame. The second frame 405(2) includes a command phase 415(2), a data phase 420(2), and a CRC phase 425(2). The command phase 415(2) of the second frame 405(2) can include one or more status responses (e.g., encoded in the serial data output signal 445) to one or more commands received in the command phase 415(1) of the first frame 405(1) (e.g., in a serial data input signal 440). As part of the one or more status responses in the second frame 405(2), the peripheral device interface can inform the master controller of any faults that occur after the beginning of the first frame 405(1) and before the beginning of the second frame 405(2). Thus, the latency of fault reporting and reaction to faults is dependent on the frequency of frame transmission.

Between the first frame 405(1) and the second frame 405(2), a chip select signal 430 can remain high, indicating that communications with the peripheral device interface are not enabled. A clock signal 435 can continue to periodically vary between a high value and a low value to provide timing for other peripheral device interfaces that share the same clock bus. A serial data input signal 440 and a serial data output signal 445 can also be used for communications between the master controller and other peripheral device interfaces that are enabled using chip select lines that correspond to the other peripheral device interfaces. During the intervening time period, the peripheral device interface is unable to communicate with the master controller via the serial communication bus.

In a functional safety system, the maximum acceptable system level response time for reacting to a fault can be defined as a fault tolerant time interval (FTTI). Each peripheral device interface in the overall system is allocated a particular amount of time (and a particular periodic or intermittent frame slot) for communicating with the master controller, and the amount of time available to communicate to the master controller can be defined as a fault detection time interval (FDTI). For example, if a fault occurs during transmission of the first frame 405(1), the fault detection time interval may represent the amount of time between occurrence or detection of the fault at the peripheral device and the command phase 415(2) of the second frame 405(2), when the fault can be reported to the master controller. The overall system can also have a fault reaction time interval (FRTI) that represents the amount of time needed to react to and address a fault once the fault is communicated to the master controller. To satisfy the maximum acceptable system level response time, the fault detection time interval plus the fault reaction time interval should be less than the fault tolerant time interval (i.e., FDTI+FRTI<FTTI). If the fault reaction time interval is relatively predictable and consistent, then satisfying the maximum acceptable system level response time may necessitate decreasing the fault detection time interval, which can be accomplished by increasing the frequency of polling of fault flags through serial communication. Such polling of fault flags, for example, can be performed through enabling communications with the peripheral device interface (e.g., using the chip select signal 430), which allows the peripheral device interface to transmit status data including fault reporting data (e.g., in the command phase 415(2) of the second frame 405(2) for faults that occur after the beginning of the first frame 405(1)). In other words, higher frequency polling can be accomplished by decreasing the amount of time between the first frame 405(1) and the second frame 405(2). Higher frequency polling, however, places an additional burden on software and serial communications in the overall system.

Figure 5A:
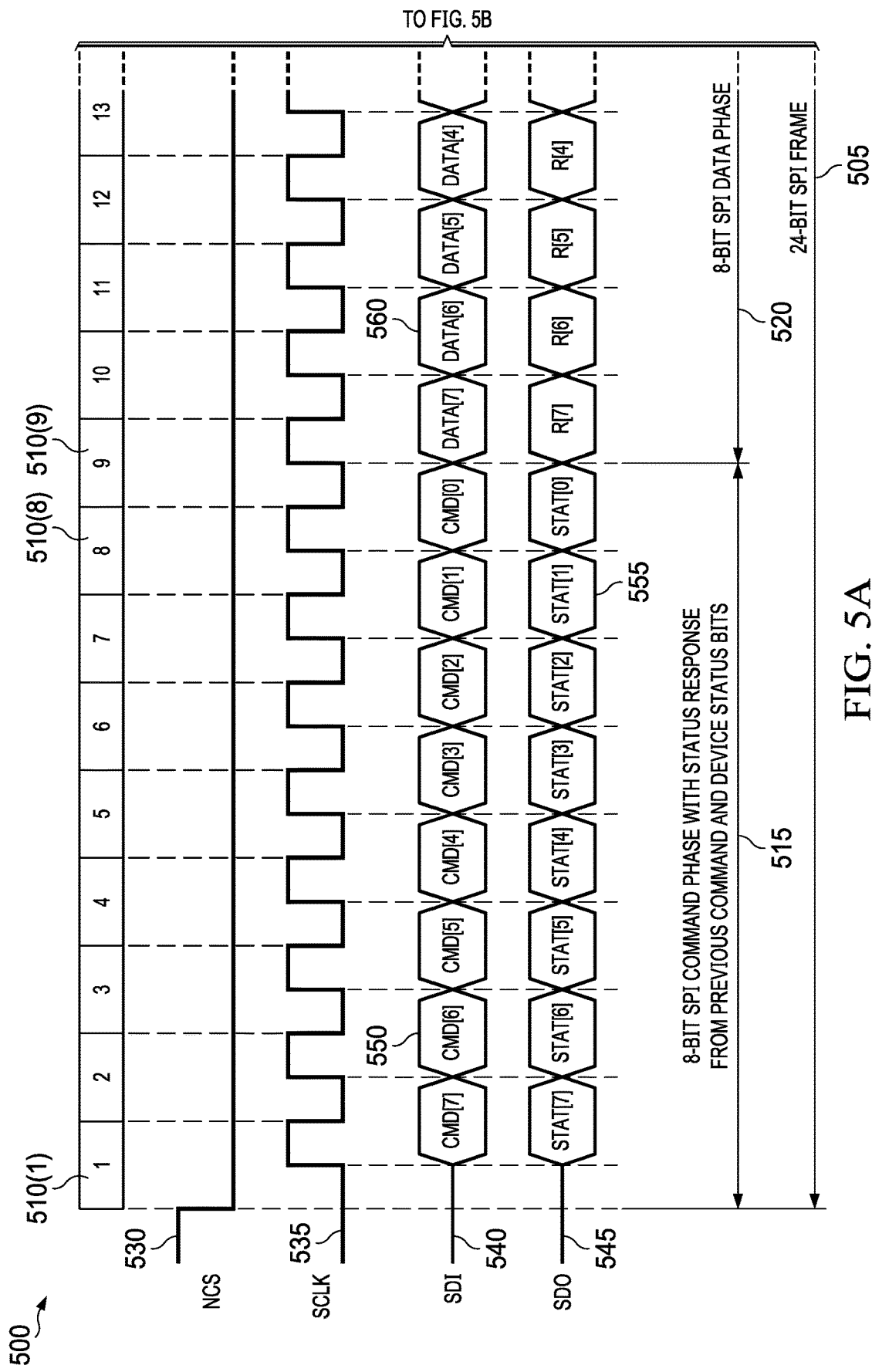
FIG. 5A-5B is a waveform timing diagram for a frame of a serial peripheral interface (SPI) bus in accordance with an alternative implementation of communications between a master controller and a peripheral device.
Figure 5B:
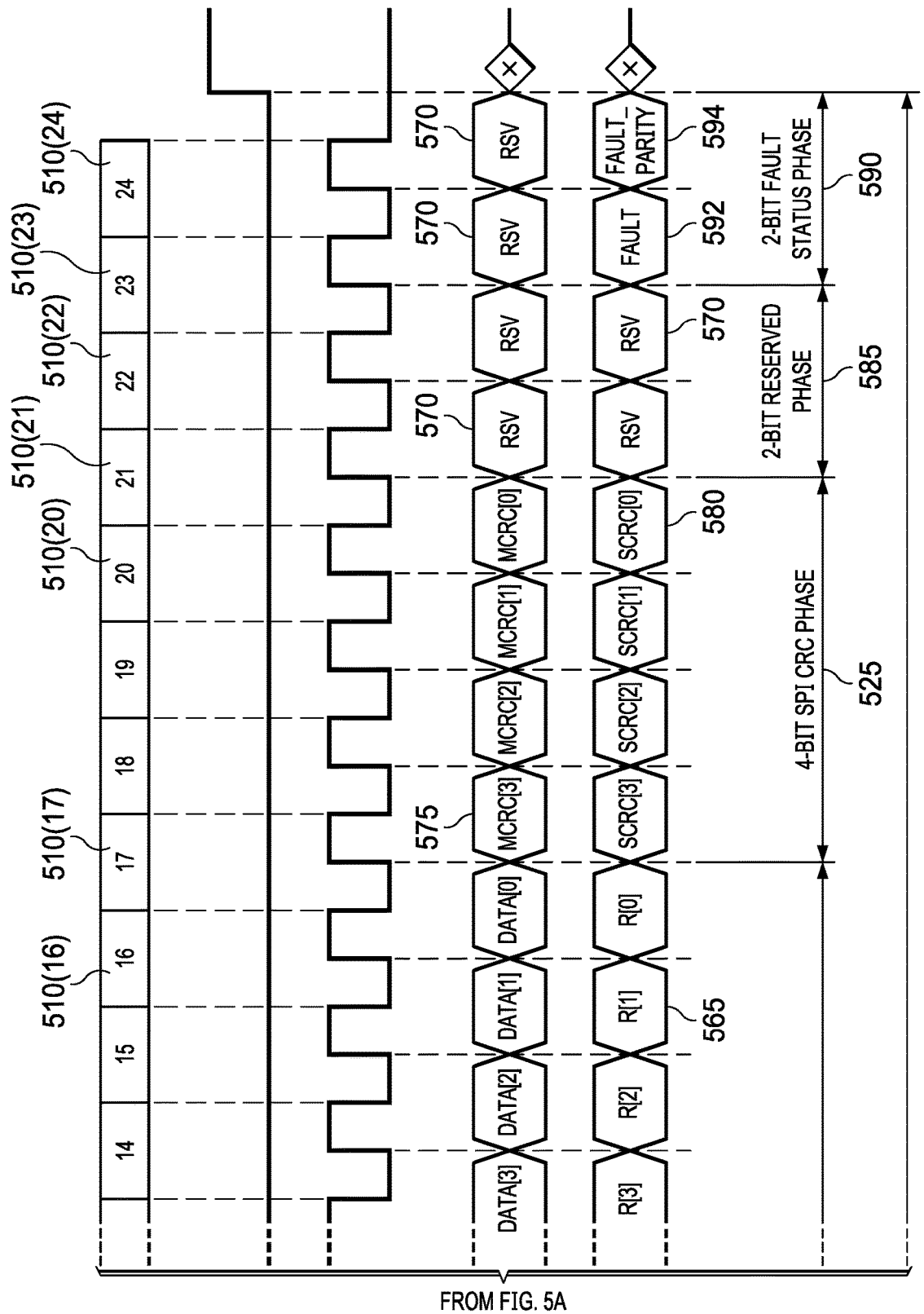

FIG. 5A-5B shows a waveform timing diagram 500 for a frame 505 of a serial peripheral interface (SPI) bus in accordance with an alternative implementation of communications between a master controller and a peripheral device. Analogous to the frame 305 of FIG. 3A-3B, the frame 505 includes multiple timeslots 510, a command phase 515 that begins with a first timeslot 510(1) and ends with an eighth timeslot 510(8), and a data phase 520 that begins with a ninth timeslot 510(9) and ends with an $16^{th}$ timeslot 510(16). Communications between the peripheral device interface and the master controller are enabled using a chip select signal 530, timeslots 510 are defined by a clock signal 535, communications from the master controller to the peripheral device interface are transmitted in a serial data input signal 540, and communications from the peripheral device interface to the master controller are transmitted in a serial data output signal 545. Each timeslot 510 of the command phase 515 includes a command bit 550 of the serial data input signal 540 and a status bit 555 of the serial data output signal 545, and each timeslot 510 of the data phase 520 includes a master data bit 560 of the serial data input signal 540 and a peripheral data bit 565 of the serial data output signal 545.

Differing from the example frame 305 of FIG. 3A-3B, however, the example frame 505 includes a shorter 4-bit CRC phase 525 that follows the command phase 515 and the data phase 520, beginning with a $17^{th}$ timeslot 510(17) and ending with a $20^{th}$ timeslot 510(20). The example frame 505 also includes a 2-bit reserved phase 585 in timeslots 510(21) and 510(22) and a 2-bit fault status phase 590 in timeslots 510(23) and 510(24). The reserved phase 585 follows the CRC phase 525 and includes reserved bits 570. The fault status phase 590 follows the reserved phase 585 and includes additional reserved bits 570 in the serial data input signal 540, and a fault bit 592 and a fault parity bit 594 in the serial data output signal 545. The fault bit 592 can be set to indicate whether a fault occurred during transmission of the frame 505. For example, the fault bit 592 can be a flag, where a value of 1 indicates that a fault is detected and a value of 0 indicates that no fault is detected (or vice versa). The fault parity bit 594 can be a redundant fault bit, a parity bit for the frame 505 or a portion of the frame 505 (e.g., based on which the value of the fault bit 592 can be confirmed if there is an error in receiving the fault bit), or can otherwise provide some redundancy for protecting against communication errors.

In some implementations, one or more of the following additional or alternative features can be included. The fault bit 592 can be used to indicate whether a communication fault is detected in the frame 505 (e.g., bits are missing from the transmission, an unrecognized value is received, or the CRC value indicates an error that cannot be corrected), a diagnostic error is detected in the peripheral device (e.g., a sensor, power management component, or driver has an error condition), or both (e.g., a fault flag is set if either a communication fault or diagnostic fault is detected). The frame 505 can include redundant fault bits 592 and fault parity bits 594 (e.g., instead of the reserved bits 570 in the reserved phase 585). The fault status phase 590 can encode additional information, such as the type of fault that is detected (e.g., missing bits or a CRC error). The fault parity bit 594 or the CRC phase 525 can be omitted. In some implementations, the command phase 515, the data phase 520, and/or the CRC phase 525 are not sequential but are instead interleaved (e.g., the frame 505 includes alternating status bits 555 and data bits 565). Detection of a fault during the frame 505 can include situations where a fault occurs before the start of the frame 505 (e.g., prior to the first timeslot 510(1)) but the fault is not recognized by the peripheral device until after the start of the frame 505 or after the values of the status bits 555 are placed in a buffer for transmission (e.g., the existence of the fault is not identified in time to indicate the fault in the command phase 515).

By appending a fault flag at the end of the frame, the latency of fault detection by the master controller and in the overall system can be reduced by one frame. As a result, the time between transmissions can potentially be extended (e.g., if communications with a peripheral device interface would be enabled every five microseconds in the implementation illustrated in FIGS. 3 and 4, communications may be reduced to only every ten microseconds in the implementation of FIG. 5A-5B). In addition, faults that occur during transmission of a frame can be immediately addressed, and the master controller can take suitable actions to respond to the fault. For example, the master controller, in some implementations, can enable communications with the peripheral device interface out of an ordinary periodic sequence to more quickly receive status data that provides more details about the nature of the fault or to resend the frame in which the error occurred (e.g., the fault bit serves as an immediate interrupt to typical operations). Appending the fault bit can thus avoid a potential need to add a separate interrupt pin to the master controller and peripheral device circuitry. The fault status phase 590 does not necessarily communicate as much information about a fault as can be communicated in the command phase 515. Rather, the fault status phase 590 can, in some implementations, simply indicate that a fault is detected, and additional information about the fault can be communicated in a subsequent frame 505.

Figure 6A:
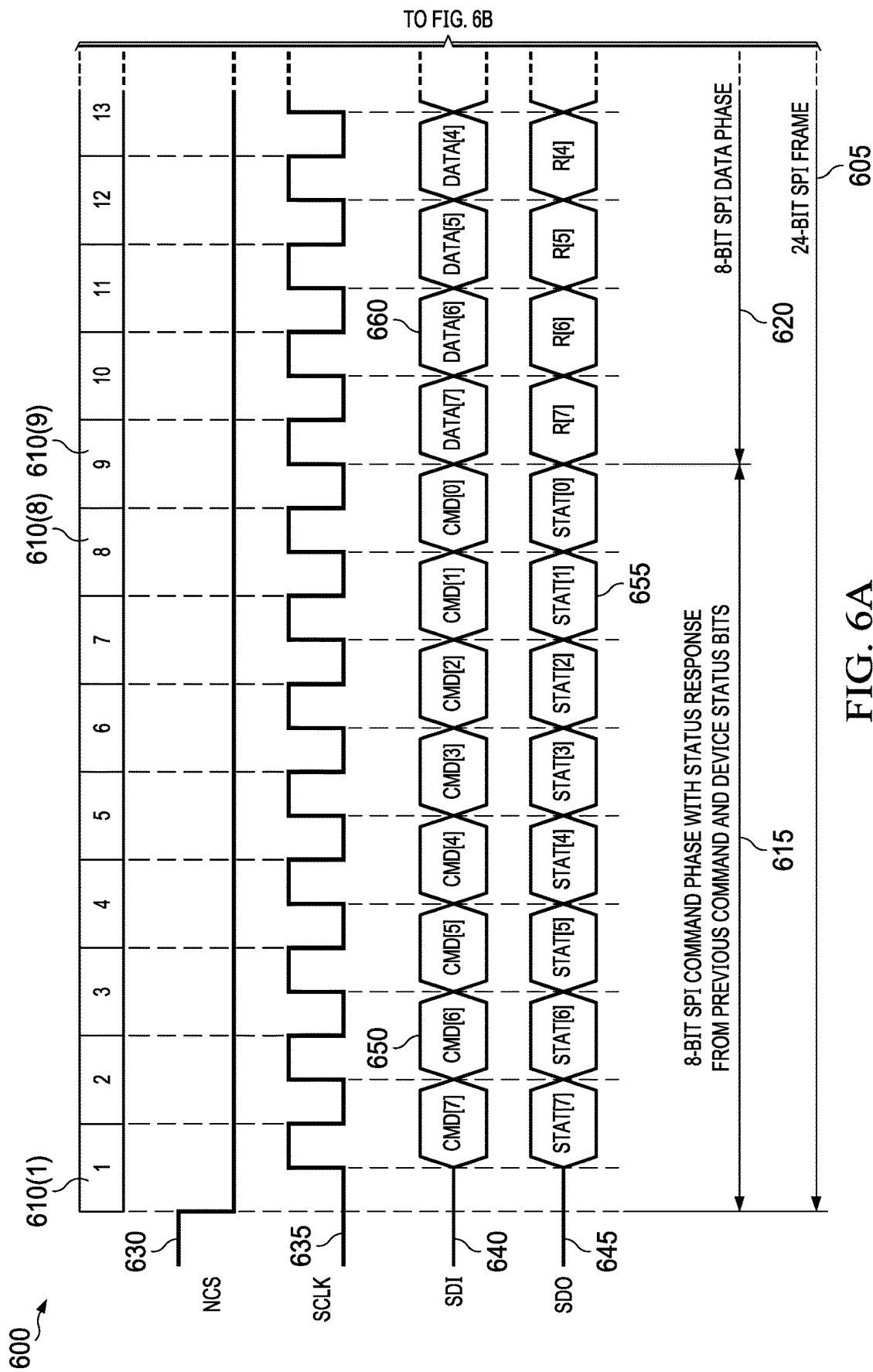
FIG. 6A-6B is a waveform timing diagram for a frame of a serial peripheral interface (SPI) bus in accordance with an alternative implementation of communications between a master controller and a peripheral device.
Figure 6B:
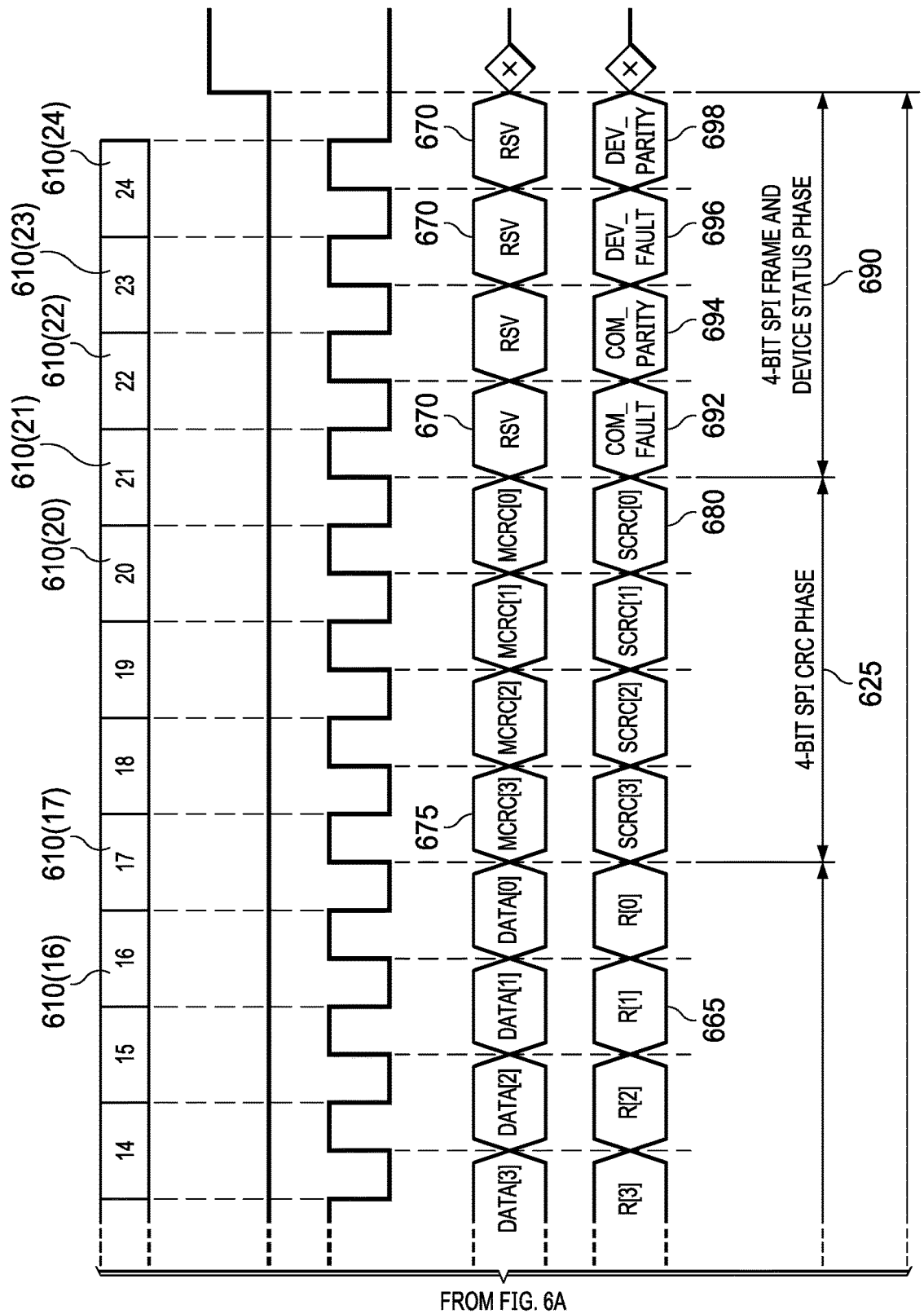
Figure 7A:
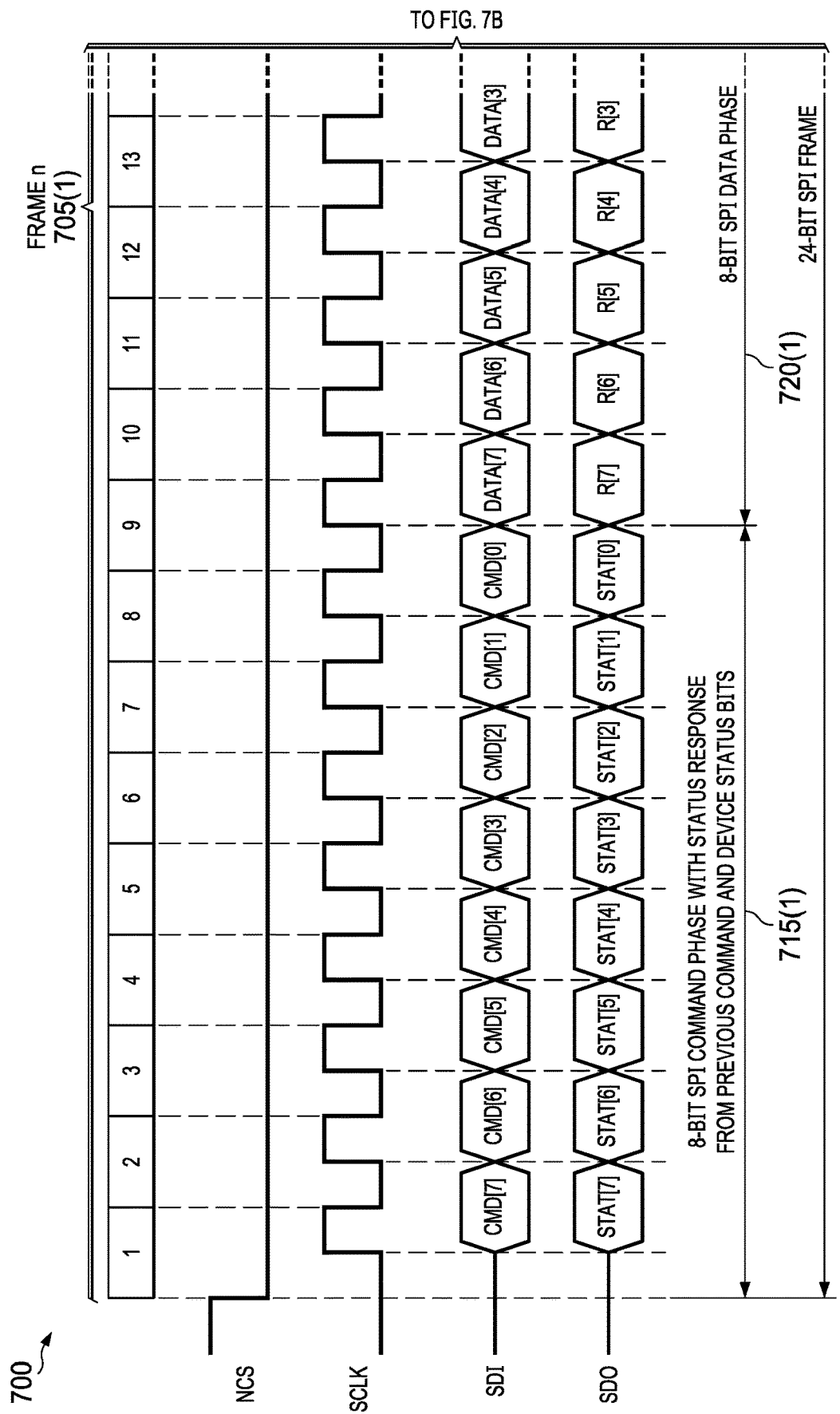
FIG. 7A-7D is a waveform timing diagram for a sequential pair of frames of the serial peripheral interface (SPI) bus discussed in connection with FIG. 5A-5B.
Figure 7B:
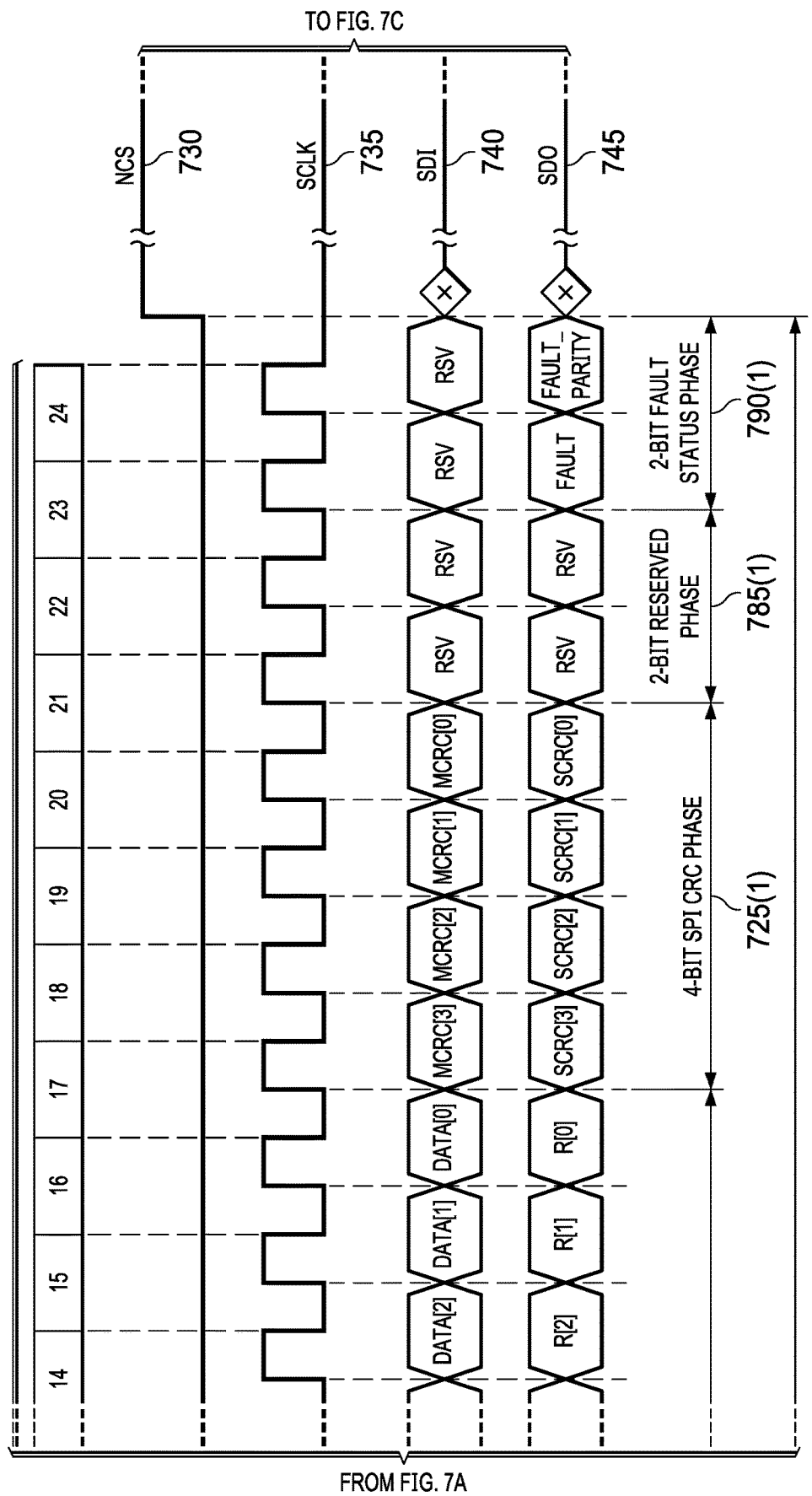
Figure 7C:
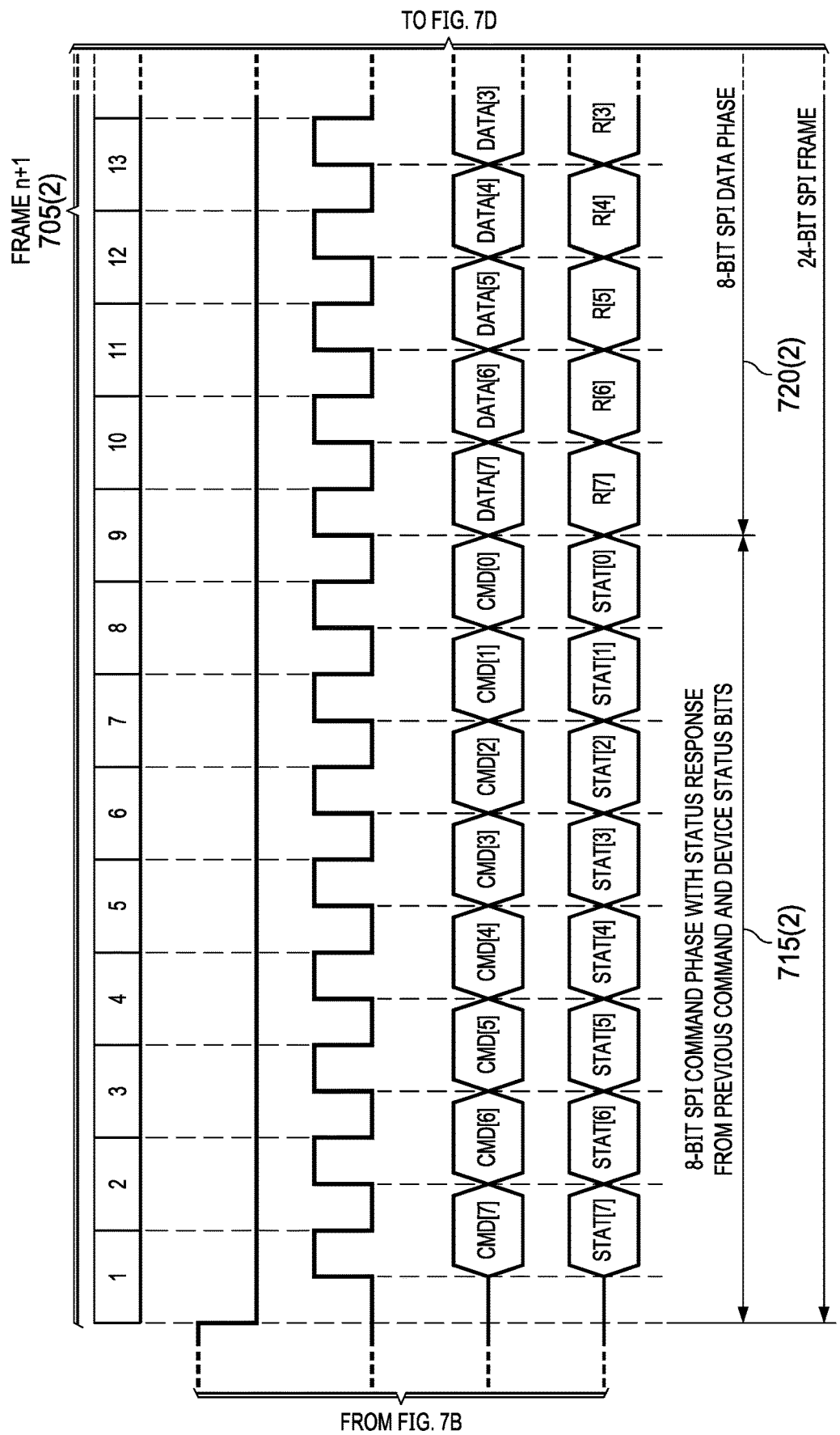
Figure 7D:
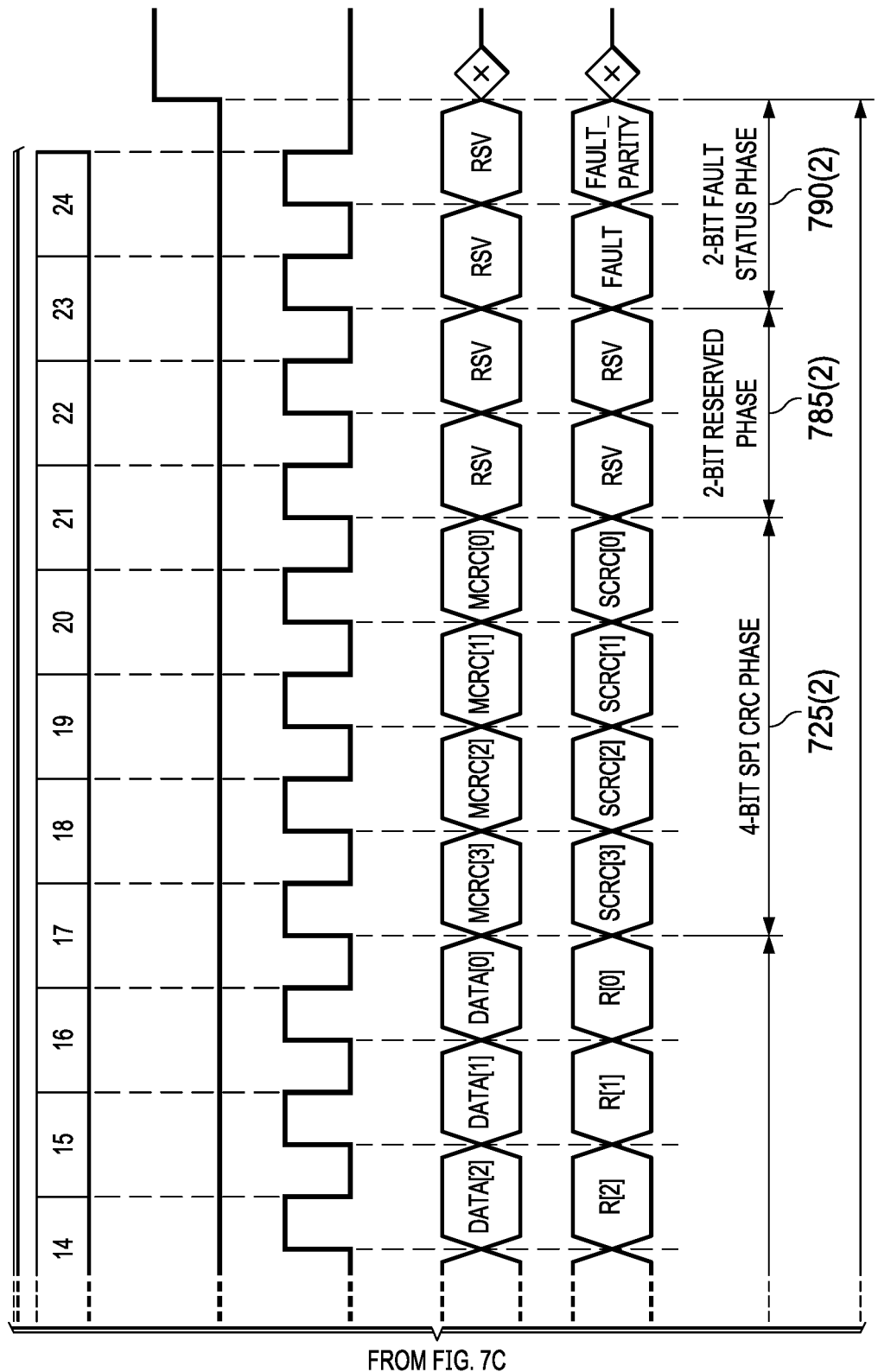

FIG. 6A-6B shows a waveform timing diagram 600 for a frame 605 of a serial peripheral interface (SPI) bus in accordance with an alternative implementation of communications between a master controller and a peripheral device. Analogous to the frame 505 of FIG. 5A=5b, the frame 605 includes multiple timeslots 610, a command phase 615 that begins with a first timeslot 610(1) and ends with an eighth timeslot 610(8), a data phase 620 that begins with a ninth timeslot 610(9) and ends with an $16^{th}$ timeslot 610(16), and a CRC phase 625 that follows the command phase 615 and the data phase 620, beginning with a $17^{th}$ timeslot 610(17) and ending with a $20^{th}$ timeslot 610(20). Communications between the peripheral device interface and the master controller are enabled using a chip select signal 630, timeslots 610 are defined by a clock signal 635, communications from the master controller to the peripheral device interface are transmitted in a serial data input signal 640, and communications from the peripheral device interface to the master controller are transmitted in a serial data output signal 645. Each timeslot 610 of the command phase 615 includes a command bit 650 of the serial data input signal 640 and a status bit 655 of the serial data output signal 645, and each timeslot 610 of the data phase 620 includes a master data bit 660 of the serial data input signal 640 and a peripheral data bit 665 of the serial data output signal 645.

Differing from the example frame 505 of FIG. 5A-5 B, however, the example frame 605 includes a 4-bit frame and device status phase 690 that begins with a $21^{st}$ timeslot 610(21) and ends with a $24^{th}$ timeslot 610(24). The frame and device status phase 690 follows the CRC phase 625 and includes reserved bits 670 in the serial data input signal 640, a communication fault bit 692, a communication fault parity bit 694, a device fault bit 696, and a device fault parity bit 698 in the serial data output signal 645. The communication fault bit 692 can be set to indicate whether a communication fault occurred during transmission of the frame 605, and the device fault bit 696 can be set to indicate whether a diagnostic fault occurred during transmission of the frame 605. For example, the communication fault bit 692 and the device fault bit 696 can each be a flag, where a value of 1 indicates that a fault is detected and a value of 0 indicates that no fault is detected (or vice versa). The communication fault parity bit 694 and the device fault parity bit 698 can each be a redundant fault bit or can otherwise provide some other type of redundancy for protecting against communication errors.

Compared to the example frame 505 of FIG. 5A-5B, the example frame 605 of FIG. 6A-6B can further enable the peripheral device interface to separately communicate whether a detected fault is a communication fault or a diagnostic fault (or both), which allows the master controller to respond accordingly. In some implementations, the CRC phase 625 can be omitted or the CRC phase 625 can follow the frame and device status phase 690. The fault status phase 690 can alternatively include a different number of timeslots than discussed in the examples of FIG. 5A-5B and FIG. 6A-6B. In some implementations, the fault status phase 690 can communicate other types of limited information about the fault while relying upon a subsequent frame 605 to communicate additional information. For example, the fault status phase 690 can include a flag that indicates whether a fault is detected and one, two, or more bits that distinguish between different categories of faults (e.g., a two-bit code can be used to distinguish between a CRC error, another type of communication error, and two different categories of diagnostic faults).

FIG. 7A-7D shows a waveform timing diagram 700 for a sequential pair of frames 705(1) and 705(2) of the serial peripheral interface (SPI) bus discussed in connection with FIG. 5A-5B. The first frame 705(1) is not necessarily first in a sequence of frames but can be a frame n in a sequence of frames sent between the master controller and a particular peripheral device interface, while the second frame 705(2) is the next serial frame n+1 in the sequence of frames sent between the master controller and the particular peripheral device interface. The first frame 705(1) includes a command phase 715(1), a data phase 720(1), a CRC phase 725(1), a reserved phase 785(1), and a fault status phase 790(1). The command phase 715(1) of the first frame 705(1) can include one or more status responses encoded in a serial data output signal 745 to one or more commands received in a previous frame. The fault status phase 790(1) of the first frame 705(1) can include fault flags for communication faults and/or diagnostic faults that occur and/or are detected during the first frame 705(1).

The second frame 705(2) includes a command phase 715(2), a data phase 720(2), a CRC phase 725(2), a reserved phase 785(2), and a fault status phase 790(2). The command phase 715(2) of the second frame 705(2) can include one or more status responses encoded in the serial data output signal 745 to one or more commands received in the command phase 715(1) of the first frame 705(1) in a serial data input signal 740. The fault status phase 790(2) of the second frame 705(2) can include fault flags for communication faults and/or diagnostic faults that occur and/or are detected during the second frame 705(2). As part of the one or more status responses in the second frame 705(2), the peripheral device interface can inform the master controller of any faults that occur after the end of the first frame 705(1) and before the beginning of the second frame 705(2). Thus, the latency of fault reporting and reaction to faults is reduced compared to the waveform timing diagram of FIG. 4A-4D. An analogous result is also achieved using the serial peripheral interface (SPI) bus discussed in connection with FIG. 6A-6B.

Between the first frame 705(1) and the second frame 705(2), a chip select signal 730 can remain high, indicating that communications with the peripheral device interface are not enabled. A clock signal 735 can continue to periodically vary between a high value and a low value to provide timing for other peripheral device interfaces that share the same clock bus. A serial data input signal 740 and a serial data output signal 745 can also be used for communications between the master controller and other peripheral device interfaces that are enabled using chip select lines that correspond to the other peripheral device interfaces. During the intervening time period, the peripheral device interface is unable to communicate with the master controller via the serial communication bus.

In some implementations, when a fault flag in the fault status phase 790(1) of the first frame 705(1) includes a fault flag is set to indicate that a fault is detected during sending of the first frame 705(1), communication of the second frame 705(2) can be enabled sooner than would otherwise occur if the fault flag is not set. Communication of the second frame 705(2) can be enabled by the master controller setting a low level of the chip select signal 730 before the master controller would enable communication of the second frame 705(2) if the fault flag is not set. Thus, the interval between the first frame 705(1) and the second frame 705(2) can differ depending on whether the fault flag is set. For example, communication of the second frame 705(2) can be enabled relatively immediately (e.g., as soon as a serial communication frame between the master controller and another peripheral device interface is complete), as soon as an otherwise unused frame period is available on the serial bus, on a priority basis (e.g., by dynamically or statically ranking priority levels of communication for different peripheral devices depending on their respective functional safety importance and/or fault status), or at an otherwise reduced interval (e.g., a 3 microsecond interval where the standard interval without a fault indication is 10 microseconds). In some cases, the master controller can control overall communications with all of the peripheral devices that share a serial data bus such that a prioritization of communication of the second frame 705(2) for a particular peripheral device can result in an extension of a communication interval (e.g., 11 microseconds instead of 10 microseconds) for one or more of the other peripheral devices that are considered lower priority.

Figure 8:
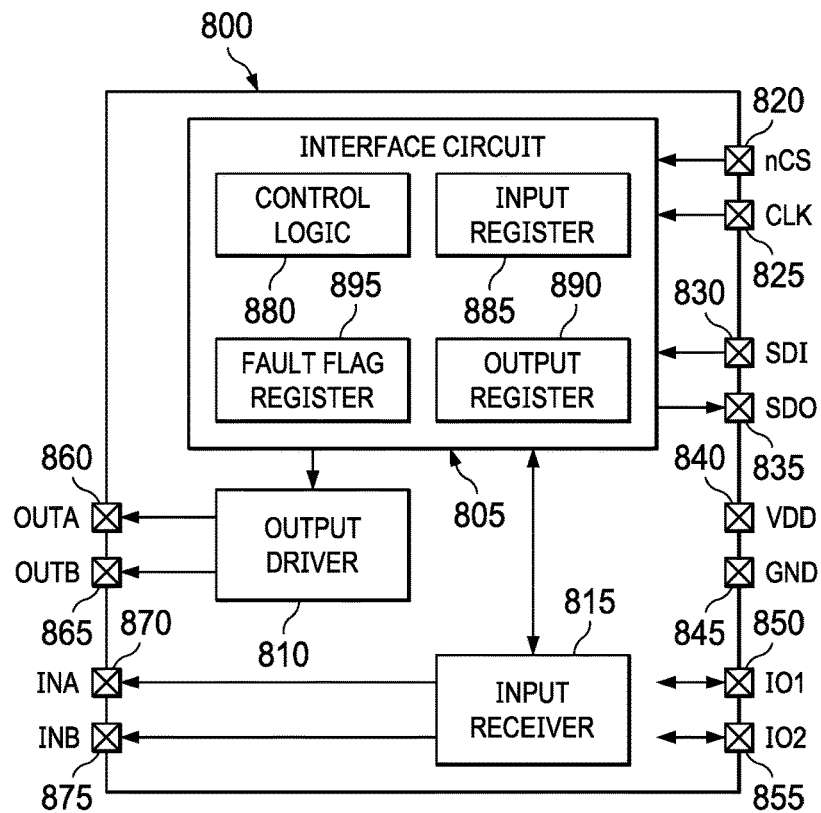
FIG. 8 is an illustration of an example peripheral device circuit that can implement the functional safety techniques described in this specification.

FIG. 8 depicts an illustration of an example peripheral device circuit 800 that can implement the functional safety techniques described in this specification. The peripheral device circuit 800 includes an interface circuit 805, an output driver circuit 810, and an input receiver circuit 815. The interface circuit 805 includes a Circuit Select Not (nCS) pin 820, a clock (CLK) pin 825, a serial data input (SDI) pin 830, and a serial data output (SDO) pin 835 through which the corresponding serial communication signals of FIGS. 3-7 can be communicated between the peripheral device interface and the master controller. The peripheral device circuit 800 can also include additional pins, including a voltage supply (VDD) pin 840, a ground (GND) pin 845, a first input/output (IO1) pin 850, and a second input/output (IO2) pin 855. The output driver circuit 810 can include a first output (OUTA) pin 860 and a second output (OUTB) pin 865, and the input receiver circuit 815 can include a first input (INA) pin 870 and a second input (INB) pin 875. In the context of the first output pin 860, the second output pin 865, the first input pin 870, and the second input pin 875, input and output refer to data sent to and received from, respectively, a connected component. Thus, output data sent via the first output pin 860, the second output pin 865 may be sent to the connected component in response to input data received via the serial data input pin 830, and input data received via the first input pin 870, and the second input pin 875 may be used by the interface circuit 805 to generate output data sent via the serial data output pin 835. Implementations may not include all of the illustrated pins, and/or other pins may also be included. One or more of the pins can be connected to, or adapted to connect to, a serial communication bus. In some implementations, one or more of the pins (e.g., the input and/or output pins 850, 855, 860, 865, 870, and 875) can be connected to, or adapted to connect to, other types of communication buses or wires (e.g., a parallel communication bus or an analog transmission wire).

The interface circuit 805 includes control logic 880, an input register 885, an output register 890, and a fault flag register 895. In some implementations, the input register 885 can include multiple registers for storing different portions of incoming data. The output register 890 and the fault flag register can also be divided into additional registers or combined into a single register. The control logic 880 controls operation of the interface circuit 805 through instructions embedded in the interface circuit 805 or stored in a register. Input signals received via the serial data input pin 830 can be stored in the input register 885 and are read and processed by the control logic 880 to, for example, control the output driver 810 and to cause the interface circuit 805 to perform communication operations in response to commands and data in a serial input frame. The control logic 880 can also control operation of the input receiver and process data received by the input receiver 815 (e.g., from a connected sensor or other component) to store bits in the output register 890, which can be used to generate an output serial data frame to be transmitted via the serial data output pin 835. The bits stored in the output register 890 can include information regarding faults detected before bits for an output serial data frame are stored in the output register 890 and/or before transmission of the output serial data frame begins. The control logic 880 can also generate the output serial data frame, causing the bits in the output register 890 to be transmitted in the output serial data frame in response to an enable signal on the Circuit Select Not pin 820 and a clock signal on the clock pin 825.

If a fault is detected during transmission of the output serial data frame, the control logic 880 can set one or more bits in the fault flag register 895 to a value or values indicating a fault. If no fault is detected, the one or more bits are set to a value or values indicating no fault is detected. The control logic 880 can cause the bits in the fault flag register 895 to be transmitted as part of the output serial data frame during which the fault is detected. Accordingly, the output serial data frame can include an indication of a fault that occurs during transmission of the output serial data frame.

The peripheral device circuit 800 can be an integrated circuit that connects to a sensor, a power stage, a power supply, or another component. The first and second output pins 860 and 865 can be used to communicate instructions (e.g., encoded commands) and other data to the connected component, and the first and second input pins 870 and 875 can be used to receive status information and other data from the connected component. In some implementations, the input/output pins 850 and 855 can be used to communicate selected data (e.g., different data than is communicated via the interface circuit 805) with other components in the overall system. For example, if the connected component is a sensor, sensor parameter data can be received via the input/output pins 850 and 855, processed or managed by the output driver circuit 810, and sent to the sensor via the output pins 860 and 865. Sensor status and analog sensor detection levels can be received via the input pins 870 and 875, processed or managed by the input receiver circuit 815, and sent to other components via the input/output pins 850 and 855.

Although the description above uses a serial peripheral interface (SPI) as an example, the techniques described in this specification can alternatively be used in other types of communication protocols and systems. For example, the techniques can be used in connection with an I²C communication bus, an I²S communication bus, or a universal asynchronous receiver/transmitter. In some implementations, instead of using separated serial data input and serial data output communication lines, a one-way communication followed by reverse direction on single data communication line can be used. In a one-way communication scenario, the fault flag can be appended to a data frame being sent by a component to a microcontroller to identify a fault detected during sending of the data frame. More than one input and output communication line can also be used to, for example, increase data rates. In some implementations, addressing of individual components can be used instead of an enable pin. Thus, an enable pin can be omitted in other situations (e.g., point-to-point communications). A clock pin can also be omitted (e.g., for at least some asynchronous serial communication protocols).

Figure 9:
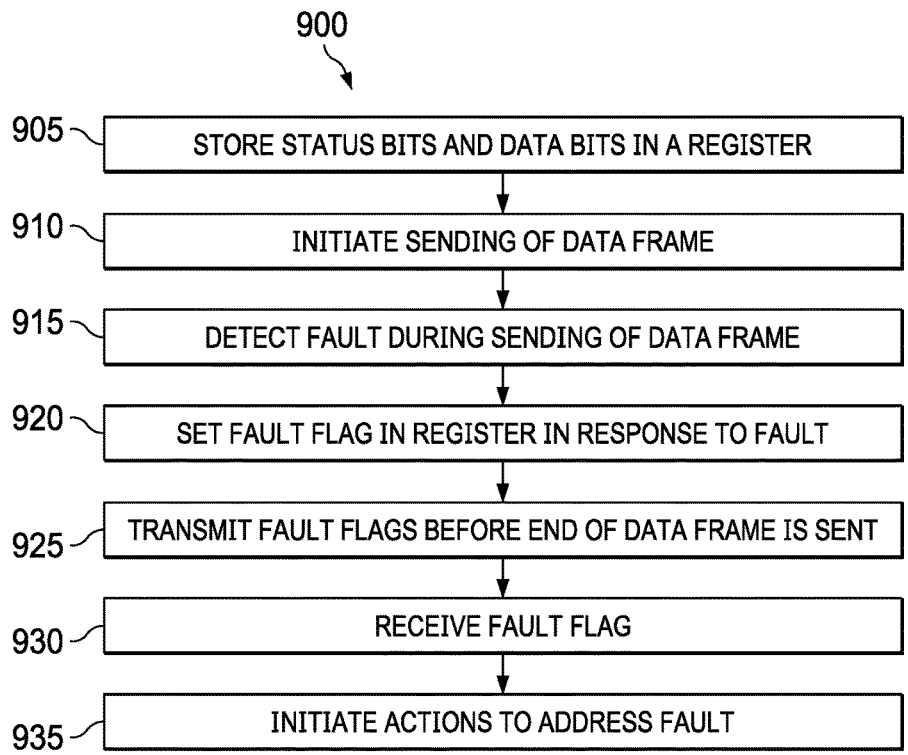
FIG. 9 is flow diagram of a process for communicating fault data in a functional safety system.

FIG. 9 is a flow diagram of a process 900 for communicating fault data in a functional safety system. Status bits and data bits are stored in a register at 905. The status bits can include information about faults detected before the data frame is sent. The data bits can include information from a sensor, power management device, driver, or other component. Sending of a data frame between a microprocessor and a component is initiated at 910. The data frame can include commands, status data (e.g., the status bits), and operational data (e.g., the data bits, diagnostic data, sensor data, power data, or other types of data). The data frame can be a data frame in a sequence of intermittent data frames communicated on a serial data bus.

A fault is detected by the component during sending of the data frame at 915. For example, the fault can be detected after setting the status bits and data bits in the register or after transmitting at least one status bit of the data frame. The fault can be a communication fault relating to the data frame (or, in some cases, a previous data frame) or a diagnostic fault relating to the component or the function or operation of the component. In response to detecting the fault, a fault flag is set in a register at 920 and transmitted before the end of the data frame at 925. The fault flag is included in the data frame after other data in the data frame. For example, the fault flag can be included at or towards the end of the data frame and/or after status data that includes information about faults detected either before the beginning of the data frame or before sending of the status data. The fault flag thus includes information about faults that are not indicated in the status data because, for example, the faults are detected after the status data is latched or sent. In addition, the fault flag can include different data than is included in the status data. For example, the fault flag can simply indicate the presence of a fault without communicating the type of fault, while the status data includes information about the type of fault, with or without a separate flag indicating the presence of a fault.

The fault flag is received (e.g., by the microprocessor) at 930. In response to the fault flag, actions to address the fault are initiated at 935. For example, the microprocessor, in response to receiving the fault flag, can initiate a system or communication interrupt of normal operations and can enable another data frame to be communicated between the microprocessor and the component to obtain additional information about the fault. The microprocessor can also (or alternatively) initiate other operations intended to correct the fault or otherwise react to or address the fault before a time that a next data frame between the microprocessor and the component (e.g., that could otherwise be used to identify the fault) would have otherwise been sent absent receipt of the fault flag. For example, the data frame can be part of a periodic sequence of data frames sent between the microprocessor and the component at a regular interval, and the microprocessor can, in response to the fault flag, initiate a subsequent communication with the component or perform some other corrective action before the regular interval elapses.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions tangibly stored on a computer readable storage device for execution by, or to control the operation of, data processing apparatus. In addition, the one or more computer program products can be tangibly encoded in a propagated signal, which is an artificially generated signal, e.g., a machine-generated electrical, optical, or electromagnetic signal, that is generated to encode information for transmission to suitable receiver apparatus for execution by a computer. The computer readable storage device can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a cross-platform runtime environment, or a combination of one or more of them.

A computer program (also known as a program, software, software application, script, or code) can be written in any form of programming language, including compiled or interpreted languages, declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a vehicle, a mobile telephone, mobile device, a personal digital assistant (PDA), a Global Positioning System (GPS) receiver, or a portable storage device (e.g., a universal serial bus (USB) flash drive), to name just a few. Devices suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CDROM and DVD-ROM disks. The processor and the memory can be supplemented by, or incorporated in, special purpose logic circuitry.

While this specification contains many implementation details, these should not be construed as limitations on the scope of the invention or of what may be claimed, but rather as descriptions of features specific to particular implementations of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the invention have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An apparatus comprising:
   a serial output communication terminal providing a serial communication; and
   an interface circuit communicably connected to the serial output communication terminal and adapted to send an output serial data frame to a controller via the serial output communication terminal, wherein each output serial data frame includes a status phase and a data phase serially followed by at least one cyclic redundancy check (CRC) bit, which is serially followed by a fault bit, in which the fault bit indicates whether a fault is detected during sending of the output serial data frame, the fault bit is followed by a redundancy bit providing a redundant indication of whether a fault is detected, and the interface circuit includes:
   control logic;
   an input register;
   a fault flag register; and
   an output register.

2. The apparatus of claim 1 further comprising a serial input communication terminal, wherein:
   the interface circuit is communicably connected to the serial input communication terminal;
   the interface circuit is adapted to intermittently receive an input serial data frame from the controller via the serial input communication terminal;
   each input serial data frame includes a command; and
   the status phase includes status data for a command included in a preceding input serial data frame.

3. The apparatus of claim 2 further comprising a peripheral device connected to the interface circuit, wherein the command included in the input serial data frame from the controller includes an instruction for the peripheral device.

4. The apparatus of claim 3 wherein the fault bit comprises a serial communication fault flag bit adapted to indicate whether a fault in the serial communication is detected and a peripheral device diagnostic detection fault bit adapted to indicate whether a fault is detected in the peripheral device.

5. The apparatus of claim 3 wherein the controller is adapted to send commands to a plurality of interface circuits, with each interface circuit connected to at least one corresponding peripheral device.

6. The apparatus of claim 5 wherein the serial input communication terminal is adapted to receive commands and operational data.

7. The apparatus of claim 5 wherein the peripheral device is selected from the group consisting of a power management integrated circuit, a motor driver, and a sensor.

8. The apparatus of claim 1 further comprising:
   a first peripheral device; and
   wherein the interface circuit includes peripheral device interface circuitry adapted to communicate with a microcontroller using a serial communication protocol, wherein the peripheral device interface circuitry is adapted to intermittently receive input serial data frames from the microcontroller using the serial communication protocol and to intermittently send output serial data frames to the microcontroller using the serial communication protocol, with each output serial data frame including one or more status bits representing communication status data in the status phase and one or more data bits representing peripheral device data in the data phase.

9. The apparatus of claim 1 wherein the interface circuit is adapted to communicate with the controller via a serial communication interface selected from the group consisting of a serial peripheral interface bus, an I2C communication bus, an I2S communication bus, and a universal asynchronous receiver/transmitter.

10. The apparatus of claim 1 further comprising:
a plurality of peripheral devices, including a first peripheral device that includes the serial output communication terminal and the interface circuit, with each peripheral device having a corresponding peripheral device interface; and
a serial communication bus connecting the corresponding peripheral device interfaces for each of the plurality of peripheral devices to a microcontroller.

11. An integrated circuit comprising:
one or more serial data communication terminals;
peripheral device interface circuitry configured to communicate with a microcontroller using a serial communication protocol, wherein the peripheral device interface circuitry is further configured to intermittently receive input serial data frames from the microcontroller via at least one of the one or more serial data communication terminals using the serial communication protocol, and to intermittently send output serial data frames to the microcontroller via at least one of the one or more serial data communication terminals using the serial communication protocol;
one or more registers accessible by the peripheral device interface circuitry, with the one or more registers including a serial data output register adapted to store data for inclusion in the output serial data frames, including one or more status bits representing communication status data, one or more data bits representing peripheral device data, and at least one fault bit; and
wherein the peripheral device interface circuitry is configured to generate each output serial data frame using data stored in the serial data output register, in which the output serial data frame includes the one or more status bits and the one or more data bits serially followed by at least one cyclic redundancy check (CRC) bit, which is serially followed by a fault bit, wherein the fault bit indicates whether a fault is detected during sending of the output serial data frame, and the fault bit is followed by a redundancy bit providing a redundant indication of whether a fault is detected.

12. The integrated circuit of claim 11 wherein the peripheral device interface circuitry is configured to store data from the input serial data frames in at least one of the one or more registers, and the input serial data frames include instructions for a peripheral device communicably coupled to the peripheral device interface circuitry.

13. The integrated circuit of claim 12 further comprising logic configured to:
set, during sending of a particular output serial data frame, a value of the fault bit in the serial data output register in response to detecting a fault in receiving the input serial data frame; and
include, in the particular output serial data frame, the value of the fault bit in the serial data output register.

14. The integrated circuit of claim 11 wherein the peripheral device interface circuitry is configured to:
set, during sending of a particular output serial data frame, a value of the fault bit in the serial data output register in response to detecting a diagnostic fault in a peripheral device communicably coupled to the peripheral device interface circuitry; and
include, in the particular output serial data frame, the value of the fault bit in the serial data output register.

15. The integrated circuit of claim 11, further comprising logic configured to:
set the one or more status bits for a particular output serial data frame to indicate whether a fault is detected;
set, during sending of a particular output serial data frame and after setting the one or more status bits, a value of the fault bit in the serial data output register in response to detecting a fault; and
include, in the particular output serial data frame, the value of the fault bit in the serial data output register.

16. A method comprising:
initiating sending of an output serial data frame to a microcontroller via a serial communication bus connected to the microcontroller, wherein the output serial data frame includes a status phase and a data phase serially followed by at least one cyclic redundancy check (CRC) bit, which is serially followed by a fault bit, and the fault bit is followed by a redundancy bit providing a redundant indication of whether a fault is detected;
detecting a fault during sending of the output serial data frame;
setting a fault flag in the output serial data frame in response to detecting the fault; and
transmitting the fault flag in the output serial data frame.

17. The method of claim 16 wherein setting a fault flag in the output serial data frame in response to detecting the fault comprises:
setting at least one fault flag bit in a register after transmitting at least one bit of the output serial data frame; and
inserting the at least one fault flag bit in the output serial data frame.

18. The method of claim 16, wherein the output serial data frame is sent by an interface circuit of a peripheral device, the method further comprising:
receiving the fault flag at the microcontroller; and
enabling a subsequent communication between the peripheral device and the microcontroller in response to receiving the fault flag at the microcontroller.

* * * * *